(12) United States Patent
Charles et al.

(10) Patent No.: US 10,970,545 B1
(45) Date of Patent: Apr. 6, 2021

(54) GENERATING AND SURFACING AUGMENTED REALITY SIGNALS FOR ASSOCIATED PHYSICAL ITEMS

(71) Applicant: Amazon Technologies, Inc., Seattle, WA (US)

(72) Inventors: Cameron Townley Charles, Seattle, WA (US); Celso Gomes, Seattle, WA (US); Justin Ross McCullum, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/692,233

(22) Filed: Aug. 31, 2017

(51) Int. Cl.
| | |
|---|---|
| *G06Q 30/06* | (2012.01) |
| *G06K 9/00* | (2006.01) |
| *G06F 3/01* | (2006.01) |
| *G06T 19/00* | (2011.01) |

(52) U.S. Cl.
CPC .......... *G06K 9/00671* (2013.01); *G06F 3/011* (2013.01); *G06Q 30/0641* (2013.01); *G06T 19/006* (2013.01)

(58) Field of Classification Search
CPC ............... G06F 3/0482; G06F 17/2765; G06F 17/30241; G06Q 30/0641; G06Q 30/0261; G06Q 30/0601; G06T 19/006; G06T 2200/24; G06T 2219/2004; G06T 7/13; G06T 15/005; G06T 19/00; A63F 13/216; A63F 13/53; A63F 2300/8082
See application file for complete search history.

(56) References Cited

U.S. PATENT DOCUMENTS

| | | | |
|---|---|---|---|
| 7,512,548 B1 * | 3/2009 | Bezos ................ | G06Q 20/0855 705/26.1 |
| 8,473,326 B1 * | 6/2013 | Griffith .............. | G06Q 30/0203 701/410 |
| 9,674,290 B1 | 6/2017 | Rincon et al. | |
| 9,824,490 B1 | 11/2017 | Côté et al. | |
| 9,911,290 B1 * | 3/2018 | Zalewski ............. | G07G 1/0072 |
| 2002/0046085 A1 * | 4/2002 | Rochon ................. | G06Q 30/02 705/14.25 |

(Continued)

OTHER PUBLICATIONS

Editor, "uZoom Launches LiveShopCast to Power Live Video Sales", Home Business Magazine, Aug. 30, 2017, https://homebusinessmag.com/businesses/ecommerce/uzoom-launches-liveshopcast-power-live-video-sales/, pp. 1-4.

(Continued)

*Primary Examiner* — Sultana M Zalalee
(74) *Attorney, Agent, or Firm* — Athorus, PLLC

(57) ABSTRACT

Systems and methods for generating and surfacing augmented reality cues associated with physical items for presentation to users during augmented reality experiences are described. In order to provide a more immersive augmented reality experience, physical items that a user may touch, taste, smell, see, and/or hear may be provided to a user within compartments of a container as part of the experience. During the augmented reality experience, particular locations along a path may be recognized using image recognition techniques, and augmented reality cues associated with particular physical items related to the recognized locations may be presented to the user.

20 Claims, 13 Drawing Sheets

(56) References Cited

U.S. PATENT DOCUMENTS

| | | | |
|---|---|---|---|
| 2003/0020707 A1* | 1/2003 | Kangas | G06F 3/011 345/418 |
| 2003/0229900 A1 | 12/2003 | Reisman | |
| 2004/0189675 A1 | 9/2004 | Pretlove et al. | |
| 2008/0040240 A1* | 2/2008 | Covington | G06Q 30/00 705/26.8 |
| 2008/0101456 A1 | 5/2008 | Ridge et al. | |
| 2008/0162305 A1* | 7/2008 | Rousso | G06Q 10/0631 705/26.5 |
| 2010/0088735 A1 | 4/2010 | Sadja et al. | |
| 2010/0138037 A1* | 6/2010 | Adelberg | G06Q 10/087 700/241 |
| 2010/0149093 A1* | 6/2010 | Edwards | G06F 3/011 345/156 |
| 2010/0332352 A1* | 12/2010 | Bucher | G06Q 30/02 705/27.1 |
| 2011/0213678 A1* | 9/2011 | Chorney | G06Q 30/06 705/26.61 |
| 2011/0216179 A1* | 9/2011 | Dialameh | G06F 17/30247 348/62 |
| 2012/0075168 A1* | 3/2012 | Osterhout | G02B 27/017 345/8 |
| 2013/0063487 A1* | 3/2013 | Spiegel | G06Q 30/02 345/633 |
| 2013/0083003 A1 | 4/2013 | Perez et al. | |
| 2013/0178257 A1* | 7/2013 | Langseth | G06T 17/05 463/4 |
| 2013/0278631 A1* | 10/2013 | Border | G06F 3/04842 345/633 |
| 2014/0100996 A1* | 4/2014 | Klein | G06Q 30/0643 705/27.2 |
| 2014/0205195 A1* | 7/2014 | Schonfeld | G06K 9/00523 382/209 |
| 2014/0253743 A1* | 9/2014 | Loxam | H04N 5/232 348/207.1 |
| 2014/0285519 A1* | 9/2014 | Uusitalo | H04W 4/029 345/633 |
| 2014/0344109 A1* | 11/2014 | Prindle | G06Q 30/0633 705/26.8 |
| 2015/0012394 A1* | 1/2015 | Rossi | G06Q 30/0643 705/27.2 |
| 2015/0058229 A1* | 2/2015 | Wiacek | G06F 21/10 705/310 |
| 2015/0127486 A1* | 5/2015 | Advani | G06Q 30/0241 705/26.41 |
| 2015/0206542 A1 | 7/2015 | Gilson | |
| 2015/0213541 A1* | 7/2015 | Lim | G06Q 30/0633 705/26.82 |
| 2015/0346722 A1 | 12/2015 | Herz et al. | |
| 2016/0103437 A1 | 4/2016 | Alfredsson et al. | |
| 2016/0253746 A1* | 9/2016 | Morrison | G06Q 30/0625 705/26.62 |
| 2016/0277802 A1 | 9/2016 | Bernstein et al. | |
| 2016/0292507 A1* | 10/2016 | Ghoson | G06F 17/30241 |
| 2016/0292710 A1* | 10/2016 | Casselle | G06Q 30/0237 |
| 2016/0349509 A1 | 12/2016 | Lanier et al. | |
| 2016/0358181 A1* | 12/2016 | Bradski | G06Q 20/40145 |
| 2017/0041557 A1 | 2/2017 | Urich et al. | |
| 2017/0061693 A1 | 3/2017 | Kohler et al. | |
| 2017/0064154 A1 | 3/2017 | Tseng et al. | |
| 2017/0124713 A1* | 5/2017 | Jurgenson | G06T 19/006 |
| 2017/0132841 A1* | 5/2017 | Morrison | G06K 9/00671 |
| 2017/0155725 A1 | 6/2017 | Rincon et al. | |
| 2018/0115706 A1 | 4/2018 | Kang et al. | |
| 2018/0276895 A1* | 9/2018 | Hodge | G09G 5/003 |
| 2019/0251622 A1* | 8/2019 | Wiedmeyer | G06Q 30/0623 |

OTHER PUBLICATIONS

Google Glass—Wikipedia, https://en.wikipedia.org/wiki/Google_Glass, downloaded from internet on Aug. 7, 2017, pp. 1-14.

Google Goggles—Wikipedia, https://en.wikipedia.org/wiki/Google_Goggles, downloaded from internet on Aug. 7, 2017, pp. 1-3.

Guven and Feiner, "Interaction Techniques for Exploring Historic Sites Through Situated Media," Proc. 3DUI '06 (Symposium on 3D User Interfaces), Alexandria, VA, Mar. 25-26, 2006, pp. 1-10.

Karsch, K., Golparvar-Fard, M., Forsyth, D. 2014. ConstructAide: Analyzing and Visualizing Construction Sites through Photographs and Building Models. ACM Trans. Graph. 33, 6, Article 176 (Nov. 2014), 11 pages.

Kinect—Wikipedia, https://en.wikipedia.org/wiki/Kinect, downloaded from internet on Aug. 7, 2017, pp. 1-15.

Microsoft HoloLens—Wikipedia, https://en.wikipedia.org/wiki/Microsoft_HoloLens, downloaded from internet on Aug. 7, 2017, pp. 1-8.

Samsung Gear VR—Wikipedia, https://en.wikipedia.org/wiki/Samsung_Gear_VR, downloaded from internet on Aug. 7, 2017, pp. 1-5.

URL: https://www.youvisit.com/ (Web Archive version dated Sep. 27, 2016, URL: https://web.archive.org/web/20160927064242/https://www.youvisit.com:80/), 7 pages.

Vlahakis et al., "Archeoguide: An Augmented Reality Guide for Archaeological Sites", IEEE Computer Graphics and Applications, Sep./Oct. 2002, pp. 52-60.

* cited by examiner

GENERATING AND SURFACING AUGMENTED REALITY SIGNALS FOR ASSOCIATED PHYSICAL ITEMS

BACKGROUND

Our world and universe is full of wonderful places, history, and natural wonders that people enjoy learning about and experiencing. People even plan special vacations, save money, and take time off from work to physically travel from their home location to a destination, often just to learn about and experience that destination location. However, physically visiting different locations is often cost and/or time prohibitive for many people. Others experience and learn about different places in the world by reading about those places, watching videos, and/or watching live presentations about those locations. However, those types of experiences require that the individual be a passive observer, watching, listening, and learning based on the information that is provided, and such experiences are typically limited to two of the senses: sight and hearing. Thus, the individuals do not have the ability to fully participate in the experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
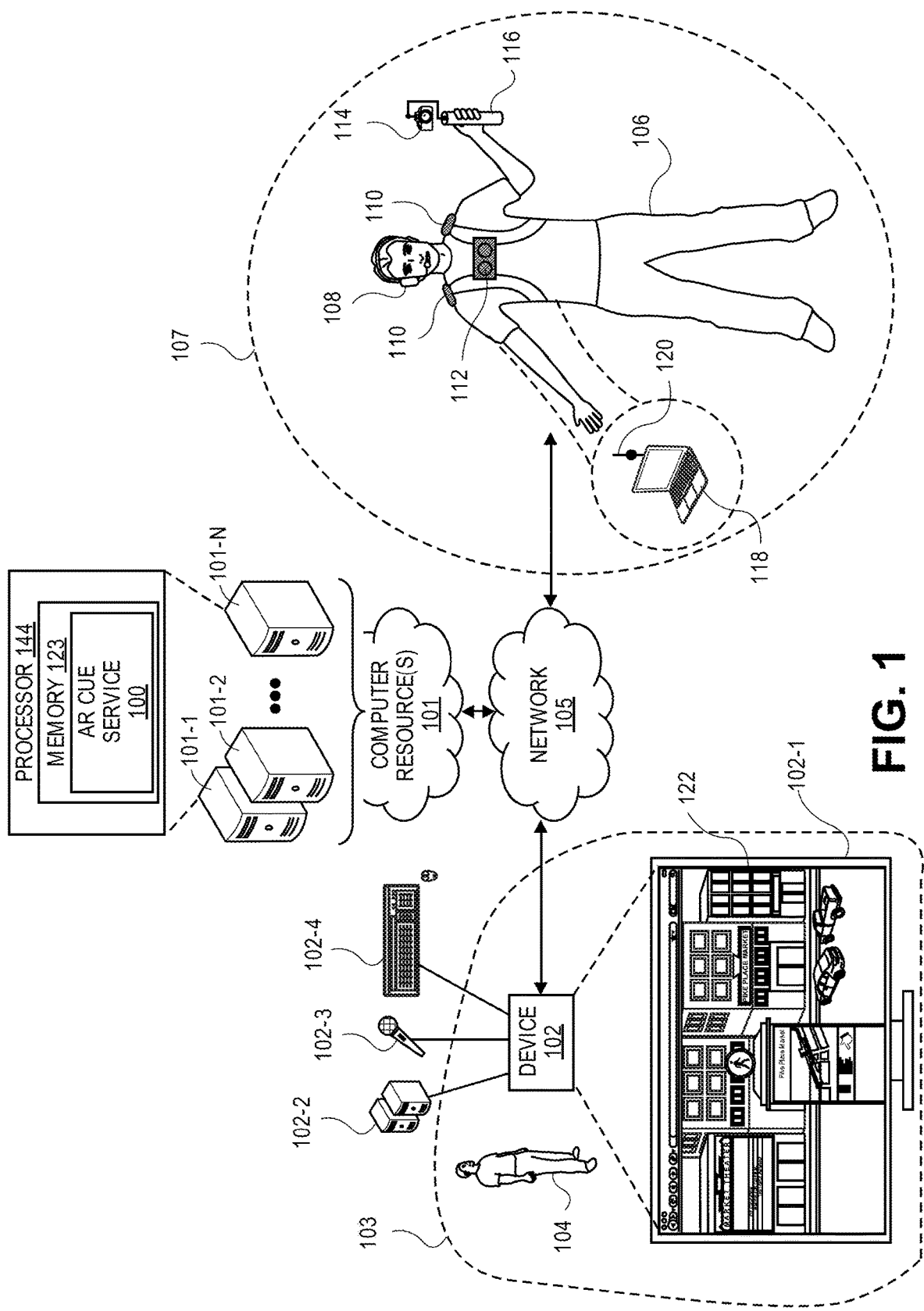
FIG. 1 illustrates an example environment in which guide transmitted environment information is augmented and presented to a user, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described are systems, methods, and apparatus that enable users to experience an environment at a destination location from their own user device, experience selected aspects of the environment with up to all five senses, control the experience, and even interact with others that are physically located within the environment. Likewise, the user's experience may be improved with the inclusion of augmented reality signals, or augmented reality cues, related to associated physical items that are presented to the user as the user experiences the environment. Users may receive the signals related to associated physical items at recognized locations along a path within the environment, interact with the signals to obtain additional signals, interact with others physically located within the environment, interact with and direct a guide that is physically located within the environment, and receive near real-time video and audio that is transmitted from a guide device located within the environment. As used herein, an environment is any area or location in which a guide and guide device are located. An environment is also referred to herein as a destination location. For example, many of the examples discussed below relate to Pike Place Market and refer to Pike Place Market as a destination location. The destination location, or environment, may be experienced by a user that is receiving video data and audio from a guide device located within the environment or destination location. Other example environments or destination locations include, but are not limited to museums, stores, restaurants, markets, buildings, factories, government facilities, parks, mountains, etc.

In one implementation, a guide with a guide device may be physically located at a destination location. The guide device is configured to transmit video data and audio data from the guide device to the user device, the user device being at any remote location. A user of the user device may be able to control a position of an imaging component (e.g., digital video camera) of the guide device, communicate with the guide, and/or communicate with others at the destination location by outputting the user's spoken audio from an output (e.g., speaker) of the guide device.

In addition, an augmented reality signal (or augmented reality cue) service, which may be part of the guide device, remote from the guide device, and/or part of the user device, may process video data generated by the imaging component of the guide device to determine if the guide device is located at one or more recognized locations along a path of an experience. For example, one or more computer vision, or image recognition, algorithms may process video data received from the imaging component of the guide device to identify one or more visual features within the environment. The visual features may include edges, surfaces, lines, objects, faces, alphanumeric characters, symbols, or other features within the video data. The image recognition algorithms may have been previously trained, using one or more training images, to recognize one or more locations along the path. If the one or more visual features correlate, at least to a threshold level of confidence, with a recognized location along the path, one or more augmented reality signals associated with the recognized location may be selected and used to augment the video data presented to the user such that the user is presented the video data and the augmented reality signals.

For example, if the user is experiencing Pike Place Market in Seattle, Wash., using the implementations discussed herein, and the video data includes images of a recognized location, e.g., a particular store or vendor, within Pike Place Market, the video data may be augmented with a signal that is relevant to the particular store or vendor. For example, the augmented reality signal that is presented with the video data may provide a cue to the user to open an associated compartment of a container including physical items provided to the user as part of the experience, and recommend that the user touch, taste, or smell a physical item, e.g., a food sample, a fragrance sample, a fabric sample, etc., associated with the recognized location.

In addition, various types and numbers of physical items may be included in a container associated with an experience, with each of the physical items being associated with respective recognized locations along a path of the experience. During generation and planning of a path for an experience, one or more locations may be selected for which physical items may be provided to users as part of the experience. Training images of the selected locations may be provided to image recognition algorithms to train such algorithms to recognize the locations. In addition, various augmented reality signals may be associated with respective recognized locations and physical items. Further, a container having compartments including the physical items may be created and associated with the experience and provided to a user as part of the experience. Each of the compartments may be closed by a cover, a seal, a flap, or other structure, and the covers may be labeled with text, numbers, symbols, indicia, or other identifiers that may be presented to the user as part of the augmented reality signals presented with the video data, in order to identify individual compartments to the user.

Moreover, each recognized location along a path of an experience may be associated with a plurality of augmented reality signals, in which each signal is associated with a respective physical item related to the location. For example, a first set of selectable augmented reality signals may be presented to a user, in which each of the first set of signals relates to a single physical item. Upon selection of one of the first set of signals, a second augmented reality signal may be presented that identifies a particular compartment of the container, and a particular physical item, to the user. Alternatively or in addition, a single augmented reality signal may identify a plurality of compartments, and a plurality of physical items, to the user.

FIG. 1 illustrates an example environment in which guide transmitted environment information is augmented and presented to a user, according to an implementation. As illustrated, the guide 106 is located at a destination location 107, which may be any location in the world, or as our travel capabilities continue to expand, any location in the universe. The guide carries and operates a guide device. The guide device includes at least one imaging component 114, such as a digital camera, a video camera, or other form of imaging component, that may be controlled by commands sent from a user device 102 and/or controlled by the guide 106. In some implementations, the imaging component 114 may be an infrared camera, a thermal imaging camera, and/or other form of imaging component. The user 104 and the user device 102 are positioned at any location, such as a user location 103 that is separate and distinct from the destination location 107. In some implementations, the imaging component 114 may be mounted to a gimbal 116, such as a two or three-axis gimbal that is held or otherwise mounted to the guide. In other implementations, the imaging component 114 may be mounted to the guide. The imaging component 114 captures images of the destination location in the form of video data and transmits those images over a network 105 to the user device 102 and/or to the remote computing resources 101 for processing by the augmented reality signal or cue service 100.

The guide device may also include one or more microphones 110 for receiving audio input from sounds within the destination location, and one or more speakers 112 for outputting sound into the environment. For example, the user 104, using a microphone at the user device 102 may provide audio input (e.g., speech) that is transmitted via the network 105 to the guide device and output through the one or more speakers 112 of the guide device.

The guide device may also include a headset 108 that enables audio communication directly between the user 104 and the guide 106. As illustrated, the headset 108 may also include a speaker (or earphone) that is used to output audio to the guide 106, and a microphone that is used by the guide to communicate directly with the user 104. The microphone(s) 110 and/or the microphone of the headset 108 may be configured to capture sounds (e.g., utterances) from a person speaking at the destination location, other sounds of the destination location, and/or sounds (e.g., utterances) of the guide. The audio signal/data may then be sent over the network 105 to the user device 102 and output through a speaker of the user device.

The guide device may also include a computing component 118, a transmitter/receiver, and an antenna 120. The antenna 120 enables wireless transmission (transmitting/receiving) between the guide device, the remote computing resources 101 and/or the user device 102. Additional details of an example guide device are discussed further below with respect to FIG. 11.

Transmission between the guide device, the user device 102, and/or the computing resources 101 may be via a network 105. The network 105 may include wired technologies (e.g., wires, USB, fiber optic cable, etc.), wireless technologies (e.g., RF, cellular, satellite, Bluetooth, etc.), and/or other connection technologies. The network 105 carries data between the guide devices, the remote computing resources 101, and/or one or more user devices 102. For example, the network 105 may carry video data and/or audio data from the guide device to the user device 102 so that the video data and/or audio data can be presented by the user device 102 to the user 104 in near real-time. For example, the presentation 122 may be video data generated from the imaging component 114 of the guide device. The presentation 122 may include the video data, which may be augmented with one or more augmented reality signals, as discussed further below. The presentation may be displayed on a display 102-1 of the user device 102, projected by a camera of the user device, output audibly using speakers 102-2 of the user device 102, etc.

In some implementations, video data and/or audio data from a guide device may be transmitted to multiple user devices. For example, video data and/or audio data from the guide device may be transmitted over the network 105 to the computing resources 101 and the computing resources may send the video data and/or audio data to the user device 102 and one or more other user devices. Likewise, the signals used to augment the video data may be different for different users and/or different user devices, e.g., based on user and/or user device characteristics, preferences, interests, histories, etc. For example, a first set of signals may be used to augment video data that is presented to the user 104 via the user device 102 and a second set of signals may be used to augment video data that is presented to a second user via a second user device. As discussed below, the video data from the guide device may be augmented with the different augmented reality signals at the guide device, at the augmented reality signal service 100 and/or at the user device(s) 102. For example, the augmented reality signal service 100 may generate first augmented video using video data from the guide device and signals corresponding to a first user 104 that is sent to the first user device 102 for presentation to the first user 104. The augmented reality signal service 100 may likewise generate second augmented video using the video data from the guide device and using signals corresponding to a second user that is sent to a second user device for presentation to the second user. As will be appreciated, any number of augmented videos may be generated using video data from the guide device, different signals from different augmented reality signal sets, and sent to any number of user devices. Likewise, in some implementations, the same augmented video may be sent to more than one user device.

As illustrated, the remote computing resources 101 may include one or more servers, such as servers 101-1, 101-2, . . . , 101-N. These servers 101-1-101-N may be arranged in any number of ways, such as server farms, stacks, and the like that are commonly used in data centers. Furthermore, the servers 101-1-101-N may include one or more processors 144 and memory 123 which may store the augmented reality signal service 100 and execute one or more of the processes or features discussed herein.

The user device 102 may be any type of device that is capable of receiving and presenting video data, audio data, and augmented reality signals to a user 104 and that is capable of transmitting control instructions to the guide device to control the imaging component 114 of the guide device. For example, the user device 102 may be a cellular phone, smart phone, desktop, laptop, and/or any other form of computing device. The user device 104 may be configured to include, among other components, a display 102-1, such as a touch-based display, one or more speakers 102-2, one or more microphones 102-3, and/or one or more interface components such as a mouse or keyboard 102-4. The speakers 102-2 may output sounds transmitted from the guide device to the user device 102. The microphone(s) 102-3 may capture sounds (e.g., utterances) from a user 104 speaking. Those sounds may be converted into audio signals, transmitted over the network 105 to the guide device and output through the guide's 106 headset 108 and/or the speakers 112. The interface components, such as the mouse and keyboard 102-4, may be used to control the orientation of the imaging component 114 of the guide device and also to interact with the video data presented via the display 102-1. For example, the user 104 may utilize an interface component to input direction or orientation commands that are transmitted over the network 105 to the guide device and used to control or alter the position or orientation of the imaging component 114.

Figure 2:
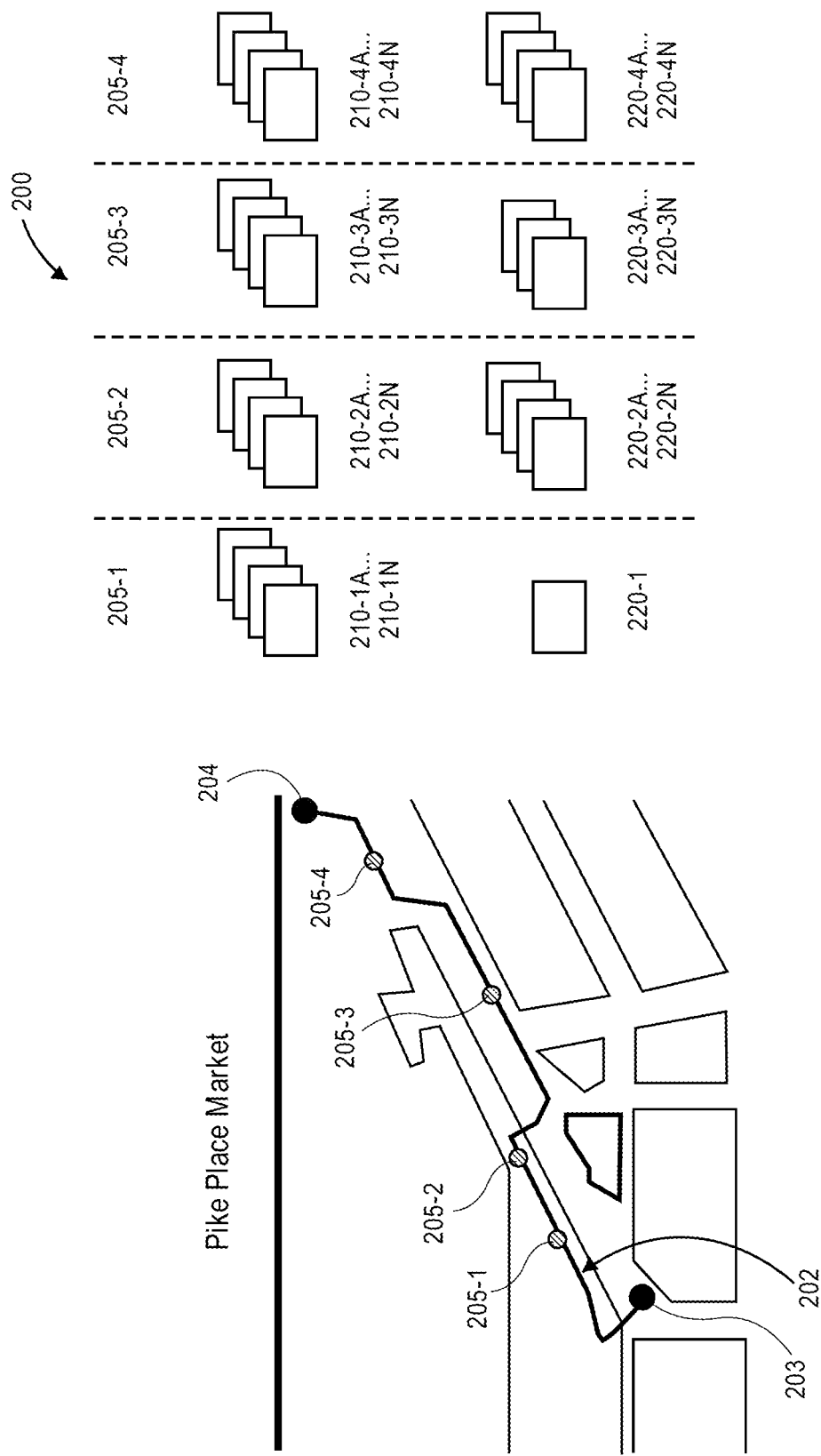
FIG. 2 illustrates an example path of an experience including recognized locations with associated imaging data and signals, according to an implementation.

FIG. 2 illustrates an example path of an experience 200 including recognized locations with associated imaging data and signals, according to an implementation. For example, the path 202 may be a path within an environment or destination location along which the guide, and guide device, plans to travel.

As shown in FIG. 2, the path 202 may begin at a starting location 203 and complete at an ending location 240, and one or more locations 205 may be visited or passed along the path 202. Although FIG. 2 shows four locations 205-1, 205-2, 205-3, 205-4, any other number of locations 205 may be included as part of the path 202. In addition, each of the locations may be associated with a region having any desired size, radius, dimensions, area, or volume, and various locations may be associated with regions of different sizes relative to each other.

For each of the locations 205, one or more training images 210 may be identified, e.g., training images 210-1A-210-1N associated with location 205-1, training images 210-2A-210-2N associated with location 205-2, training images 210-3A-210-3N associated with location 205-3, and training images 210-4A-210-4N associated with location 205-4. The training images 210 may include various features, e.g., visual features, of each of the locations 205. The training images 210 may be provided to one or more computer vision, or image recognition, algorithms in order to train such algorithms to recognize each of the locations 205. The image recognition algorithms may operate on the computing component 118 of the guide device, the augmented reality signal service 100 operating on the remote computing resources 101, the user device 102, and/or combinations thereof.

In addition, one or more augmented reality signals 220 may be associated with each of the locations 205, e.g., signal 220-1 associated with location 205-1, signals 220-2A-220-2N associated with location 205-2, signals 220-3A-220-3N associated with location 205-3, and signals 220-4A-220-4N associated with location 205-4. As described further herein, each of the signals 220 may be associated with a physical item available from or related to the respective location 205. The signals 220 may provide information or details related to respective recognized locations and/or physical items, and may prompt a user to select and/or try one or more physical items. Further, different numbers of signals 220 and physical items may be associated with each location 205.

Figure 3A:
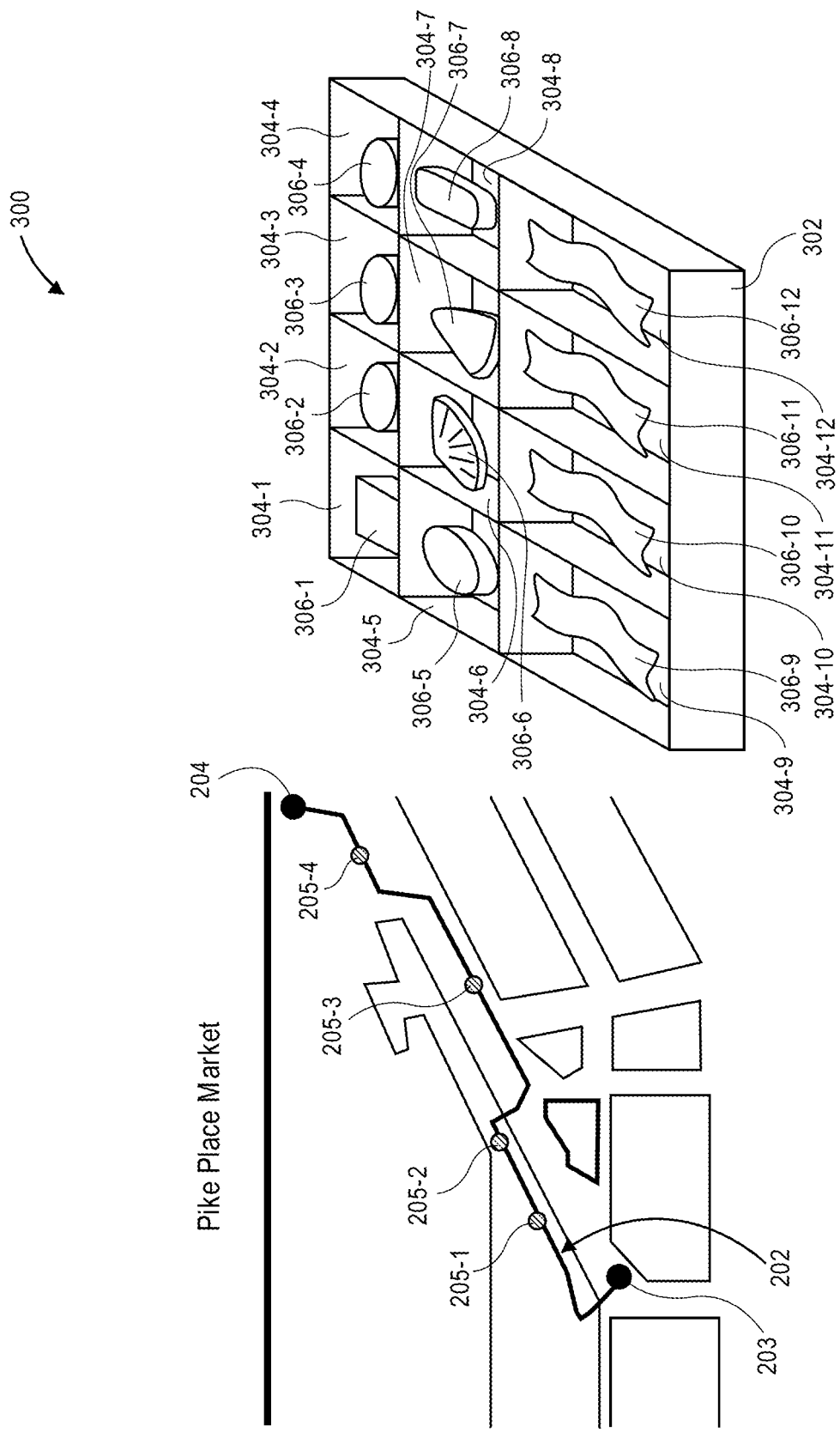
FIG. 3A illustrates an example container including physical item samples associated with recognized locations of the example path, according to an implementation.
Figure 3B:
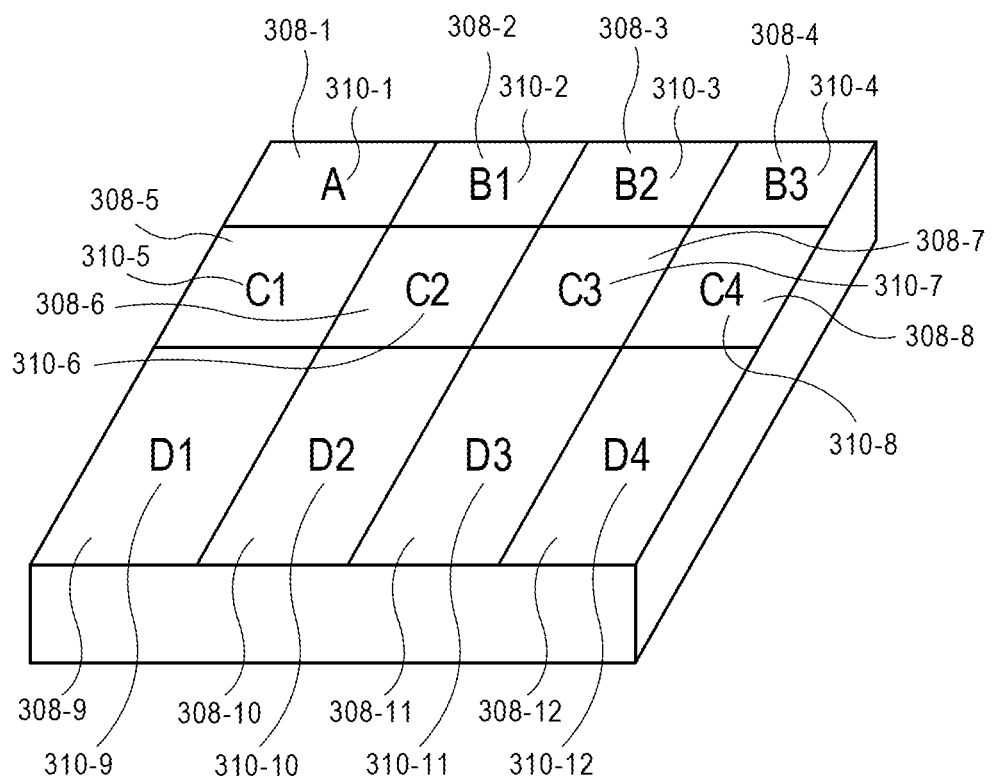
FIG. 3B illustrates another view of the example container with closed compartments including physical item samples associated with recognized locations of the example path, according to an implementation.

FIG. 3A illustrates an example container of an experience 300 including physical item samples associated with recognized locations of the example path, according to an implementation, and FIG. 3B illustrates another view of the example container with closed compartments including physical item samples associated with recognized locations of the example path, according to an implementation. As part of an augmented reality experience, a container may be provided to a user that includes physical items available from or related to respective locations along a path of the experience. The container may be provided upon receiving a request for the experience, and the corresponding container, from the user.

For example, the example container 302 may be associated with a path 202 of an experience and include any corresponding number of compartments 304. As shown in FIG. 3A, the container 302 may include twelve compartments 304-1, 304-2, 304-3, 304-4, 304-5, 304-6, 304-7, 304-8, 304-9, 304-10, 304-11, 304-12, each compartment including a physical item 306-1, 306-2, 306-3, 306-4, 306-5, 306-6, 306-7, 306-8, 306-9, 306-10, 306-11, 306-12. Continuing with this example, item 306-1 in compartment 304-1 may be associated with location 205-1, items 306-5-306-8 in compartments 304-5-304-8 may be associated with location 205-2, items 306-2-306-4 in compartments 304-2-304-4 may be associated with location 205-3, and items 306-9-306-12 in compartments 304-9-304-12 may be associated with location 205-4. Each of the items 306 may be a physical item sample associated with products available for purchase at the respective locations, which products may be uniquely available at the destination location.

In addition, as shown in FIG. 3B, each of the compartments 304 of the container 302 may include a cover, seal, flap or other structure 308 to conceal, seal, or obscure the contents of the compartment 304. Moreover, each of the covers 308 may also include an identifier 310 that is unique with respect to others of the covers. The identifier 310 may include text, numbers, symbols, indicia, colors, or other identifiers. As shown in FIG. 3B, the compartments 304 of container 302 include covers 308-1-308-12 each having an alphanumeric identifier 310-1-310-12. In addition, undersides of the covers 308 and/or internal surfaces of the compartments 304 may include further information related to the items and/or locations, such as descriptions, ingredients, materials, sources, historical information, images, purchasing information or options, barcodes, scannable elements or links, inserts, pamphlets, or any other information related to the items and/or locations. Further, the container 302 may be associated with the path 202 of the experience, and each of the compartments 304, items 306, covers 308, and/or identifiers 310 may be associated with respective locations 205 along the path of the experience.

The associations between the locations 205, the training images 210, the augmented reality signals 220, the container 302, the compartments 304, the items 306, the covers 308, and/or the identifiers 310 may be stored, e.g., in a memory of the computing component 118 of the guide device, in memory 123 associated with the augmented reality signal service 100 operating on the remote computing resources 101, in a memory of the user device 102, and/or combinations thereof.

Alternatively or in addition, the physical items may also include items that include chemically created smells that simulate one or more smells associated with recognized locations and/or objects. For example, a chemical compound, e.g., that simulates a smell of a seaside location or a smell of a food item, may be included as a physical item within a compartment of a container. The chemical compound may be sealed within the compartment until opened by a user, and/or the chemical compound may require further interaction by the user, e.g., a scratch-and-sniff interaction, to release the simulated smell. Further, an action by a user of opening a cover or flap of a compartment may unseal or reveal a surface upon which the chemical compound is applied, thereby releasing the simulated smell.

Figure 4:
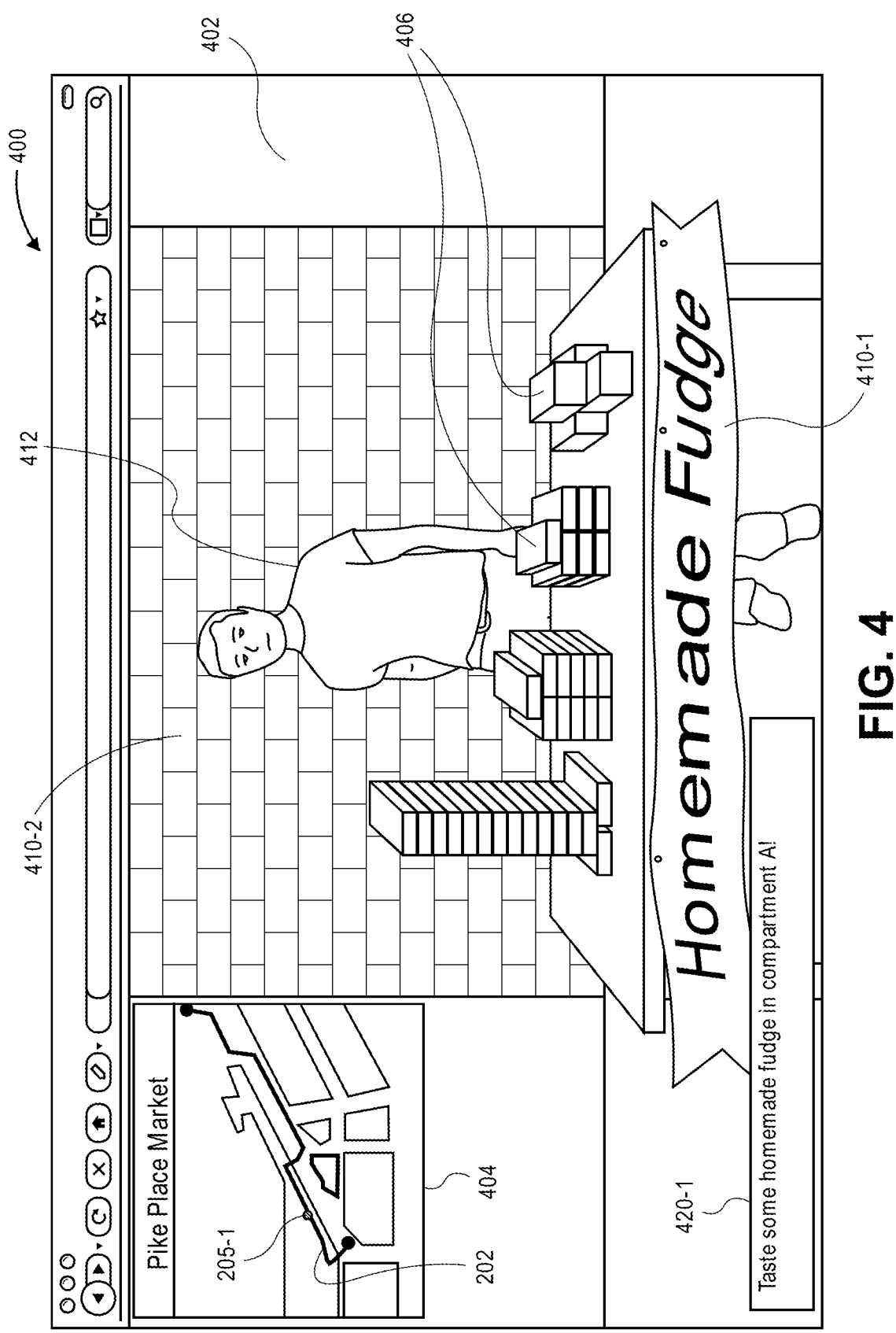
FIG. 4 illustrates a first example of video data sent from a guide device at a destination location and presented by a user device that includes a signal, according to an implementation.

FIG. 4 illustrates a first example 400 of video data sent from a guide device at a destination location and presented by a user device that includes an augmented reality signal, according to an implementation. In this example, video data 402 is generated with an imaging component of a guide device and processed using one or more image processing techniques to determine if a recognized location is associated with the video data.

As video data is captured by the imaging component 114 of the guide device, the video data is processed to determine if the video includes one or more features, e.g. visual features such as edges, surfaces, lines, objects, faces, alphanumeric characters, symbols, or other features, associated with one or more recognized locations along a path of an experience. For example, various features 406, 410, 412 within the video data 402 may be processed by image recognition algorithms. The features may include a sign or placard 410-1, items 406, people 412, characters, logos, labels, symbols, or other objects in the foreground, as well as a wall 410-2, signs, characters, logos, labels, symbols, or other objects in the background. As discussed herein, processing of the video may be done by the computing component 118 of the guide device, by the augmented reality signal service 100 operating on the remote computing resources 101, by the user device 102, and/or by combinations thereof.

For example, one or more object detection algorithms, edge detection algorithms, etc. may be used to detect features in the video data and those features may be compared with a plurality of stored feature information corresponding to recognized locations along the path of the experience within the destination location. In some implementations, features in video data may be detected using the Scale-Invariant Feature Transform (SIFT) algorithm and the detected features compared with feature information of recognized locations maintained in a data store. If one or more detected features correspond with a recognized location above a threshold degree of confidence, it may be determined that the guide device is located at the recognized location, and one or more augmented reality signals associated with the recognized location may be selected and used to augment the video data presented by the user device.

For example, as shown in FIG. 4, it may be determined, based on processing of visual features by image recognition algorithms, that the guide device is located at or near location 205-1 along the path 202. Alternatively, a GPS sensor or other location-determining sensors associated with the guide device, as described further herein, may provide additional data to identify a location of the guide device, potentially in combination with the image processing techniques described herein, and the location data from such sensors may be used to trigger the identification, rendering, and/or display of associated augmented reality signals. Moreover, a guide may be able to manually trigger augmented reality signals associated with a location, potentially in combination with location identification via image processing techniques and/or location data from sensors, via interaction with components of the guide device, e.g., a touch interface, a mechanical input, or other input devices. Further, an inset map detail 404 may also be presented with the video data 402, e.g., to help orient and guide the user along the path.

Upon determining that the guide device is located at or near location 205-1, an augmented reality signal 420-1 associated with the recognized location may be presented with the video data 402. Further, based on the stored associations between the location 205-1 and the augmented reality signals 220, e.g., augmented reality signal 420-1, container 302, compartments 304, items 306, covers 308, and/or identifiers 310, the presented augmented reality signal 420-1 may include recommendations to try a physical item provided to the user in the container as part of the experience, e.g., item 306-1 in compartment 304-1 with cover 308-1 having identifier 310-1, i.e., "A." In addition, the augmented reality signal 420-1 may also include one or more selectable links to other websites or external entities and/or purchasing options related to items available from locations.

Figure 5:
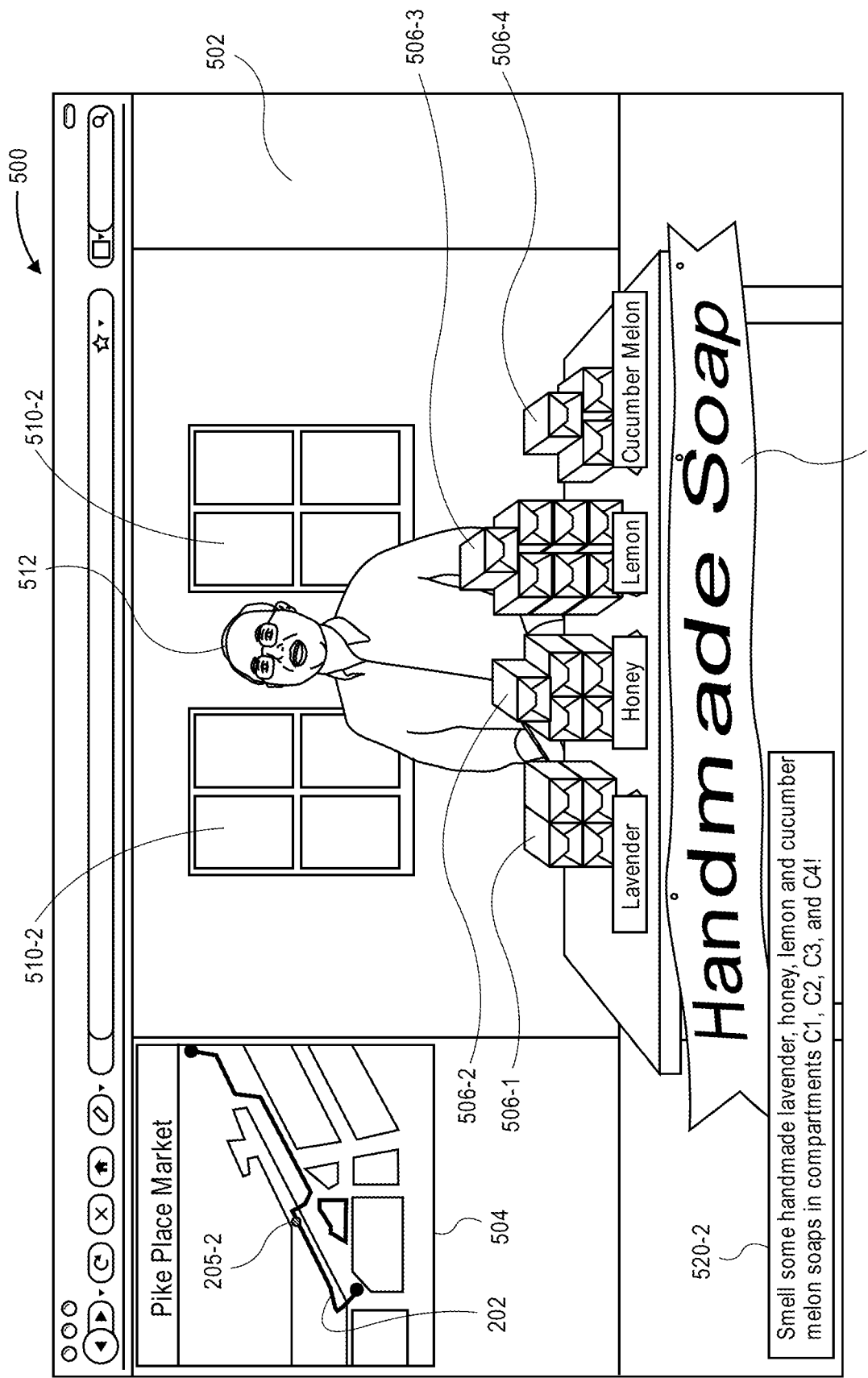
FIG. 5 illustrates a second example of video data sent from a guide device at a destination location and presented by a user device that includes a signal, according to an implementation.

FIG. 5 illustrates a second example 500 of video data sent from a guide device at a destination location and presented by a user device that includes an augmented reality signal, according to an implementation. In this example, video data 502 is generated with an imaging component of a guide device and processed using one or more image processing techniques to determine if a recognized location is associated with the video data.

As described herein, video data captured by the imaging component 114 of the guide device is processed to determine if the video includes one or more features, e.g. visual features such as edges, surfaces, lines, objects, faces, alphanumeric characters, symbols, or other features, associated with one or more recognized locations along a path of an experience. For example, various features 506, 510, 512 within the video data 502 may be processed by image recognition algorithms. The features may include a sign or placard 510-1, items 506-1, 506-2, 506-3, 506-4, people 512, characters, logos, labels, symbols, or other objects in the foreground, as well as windows 510-2, signs, characters, logos, labels, symbols, or other objects in the background. As discussed herein, processing of the video may be done by the computing component 118 of the guide device, by the augmented reality signal service 100 operating on the remote computing resources 101, by the user device 102, and/or by combinations thereof.

For example, one or more object detection algorithms, edge detection algorithms, etc. may be used to detect features in the video data and those features may be compared with a plurality of stored feature information corresponding to recognized locations along the path of the experience within the destination location. If one or more detected features correspond with a recognized location above a threshold degree of confidence, it may be determined that the guide device is located at the recognized location, and one or more augmented reality signals associated with the recognized location may be selected and used to augment the video data presented by the user device.

For example, as shown in FIG. 5, it may be determined, based on processing of visual features by image recognition algorithms, that the guide device is located at or near location 205-2 along the path 202. Alternatively, a GPS sensor or other location-determining sensors associated with the guide device, as described further herein, may provide additional data to identify a location of the guide device, potentially in combination with the image processing techniques described herein, and the location data from such sensors may be used to trigger the identification, rendering, and/or display of associated augmented reality signals. Moreover, a guide may be able to manually trigger augmented reality signals associated with a location, potentially in combination with location identification via image processing techniques and/or location data from sensors, via interaction with components of the guide device, e.g., a touch interface, a mechanical input, or other input devices. Further, an inset map detail 504 may also be presented with the video data 502, e.g., to help orient and guide the user along the path.

Upon determining that the guide device is located at or near location 205-2, an augmented reality signal 520-2 associated with the recognized location may be presented with the video data 502. Further, based on the stored associations between the location 205-2 and the augmented reality signals 220, e.g., augmented reality signal 520-2, container 302, compartments 304, items 306, covers 308, and/or identifiers 310, the presented augmented reality signal 520-2 may include recommendations to try one or more physical items provided to the user in the container as part of the experience, e.g., items 306-5-306-8 in compartments 304-5-304-8 with covers 308-5-308-8 having identifiers 310-5-310-8, i.e., "C1, C2, C3, C4." As shown in this example, physical item samples of each of the available products at a recognized location may be provided, and a single augmented reality signal 520-2 indicating all the available physical item samples may be presented to the user. In addition, the augmented reality signal 520-2 may also include one or more selectable links to other websites or external entities and/or purchasing options related to items available from locations.

Figure 6:
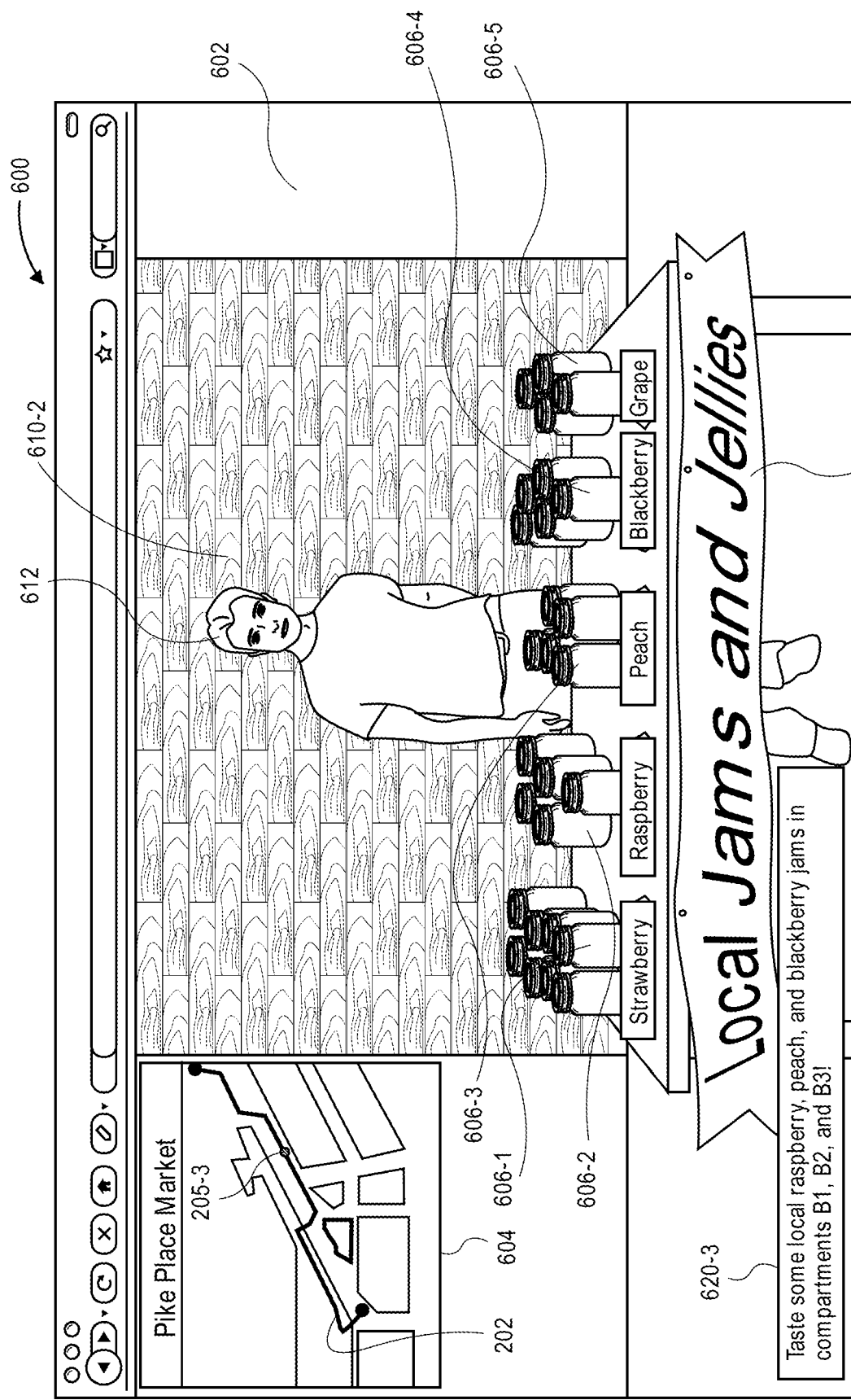
FIG. 6 illustrates a third example of video data sent from a guide device at a destination location and presented by a user device that includes a signal, according to an implementation.

FIG. 6 illustrates a third example 600 of video data sent from a guide device at a destination location and presented by a user device that includes an augmented reality signal, according to an implementation. In this example, video data 602 is generated with an imaging component of a guide device and processed using one or more image processing techniques to determine if a recognized location is associated with the video data.

As described herein, video data captured by the imaging component 114 of the guide device is processed to determine if the video includes one or more features, e.g. visual features such as edges, surfaces, lines, objects, faces, alphanumeric characters, symbols, or other features, associated with one or more recognized locations along a path of an experience. For example, various features 606, 610, 612 within the video data 602 may be processed by image recognition algorithms. The features may include a sign or placard 610-1, items 606-1, 606-2, 606-3, 606-4, 606-5, people 612, characters, logos, labels, symbols, or other objects in the foreground, as well as a wall 610-2, signs, characters, logos, labels, symbols, or other objects in the background. As discussed herein, processing of the video may be done by the computing component 118 of the guide device, by the augmented reality signal service 100 operating on the remote computing resources 101, by the user device 102, and/or by combinations thereof.

For example, one or more object detection algorithms, edge detection algorithms, etc. may be used to detect features in the video data and those features may be compared with a plurality of stored feature information corresponding to recognized locations along the path of the experience within the destination location. If one or more detected features correspond with a recognized location above a threshold degree of confidence, it may be determined that the guide device is located at the recognized location, and one or more augmented reality signals associated with the recognized location may be selected and used to augment the video data presented by the user device.

For example, as shown in FIG. 6, it may be determined, based on processing of visual features by image recognition algorithms, that the guide device is located at or near location 205-3 along the path 202. Alternatively, a GPS sensor or other location-determining sensors associated with the guide device, as described further herein, may provide additional data to identify a location of the guide device, potentially in combination with the image processing techniques described herein, and the location data from such sensors may be used to trigger the identification, rendering, and/or display of associated augmented reality signals. Moreover, a guide may be able to manually trigger augmented reality signals associated with a location, potentially in combination with location identification via image processing techniques and/or location data from sensors, via interaction with components of the guide device, e.g., a touch interface, a mechanical input, or other input devices. Further, an inset map detail 604 may also be presented with the video data 602, e.g., to help orient and guide the user along the path.

Upon determining that the guide device is located at or near location 205-3, an augmented reality signal 620-3 associated with the recognized location may be presented with the video data 502. Further, based on the stored associations between the location 205-3 and the augmented reality signals 220, e.g., augmented reality signal 620-3, container 302, compartments 304, items 306, covers 308, and/or identifiers 310, the presented augmented reality signal 620-3 may include recommendations to try one or more physical items provided to the user in the container as part of the experience, e.g., items 306-2-306-4 in compartments 304-2-304-4 with covers 308-2-308-4 having identifiers 310-2-310-4, i.e., "B1, B2, B3." As shown in this example, physical item samples of only a subset of the available products at a recognized location may be provided, and a single augmented reality signal 620-3 indicating all the available physical item samples may be presented to the user. In addition, the augmented reality signal 620-3 may also include one or more selectable links to other websites or external entities and/or purchasing options related to items available from locations.

Figure 7:
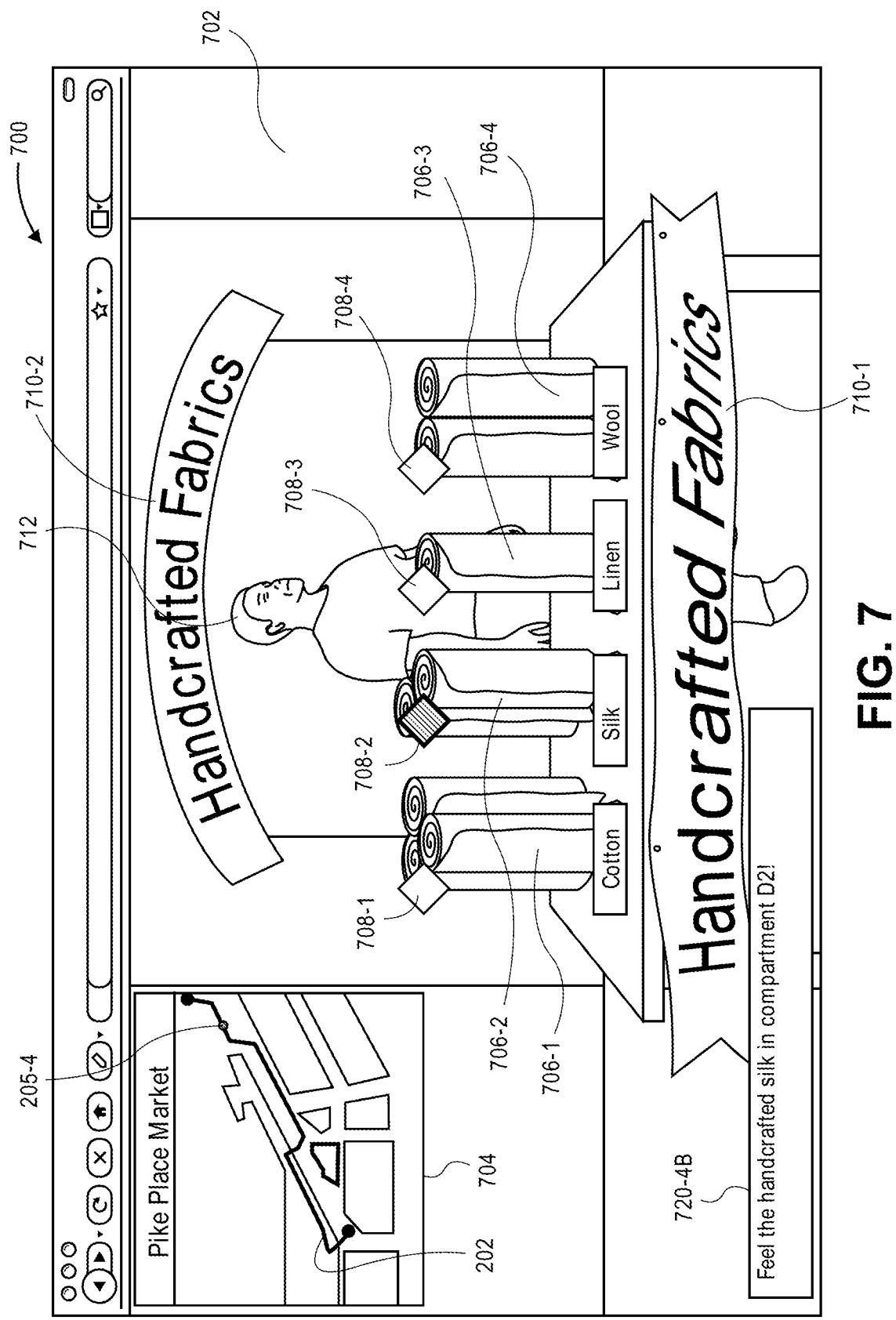
FIG. 7 illustrates a fourth example of video data sent from a guide device at a destination location and presented by a user device that includes a plurality of signals, according to an implementation.

FIG. 7 illustrates a fourth example 700 of video data sent from a guide device at a destination location and presented by a user device that includes an augmented reality signal, according to an implementation. In this example, video data 702 is generated with an imaging component of a guide device and processed using one or more image processing techniques to determine if a recognized location is associated with the video data.

As described herein, video data captured by the imaging component 114 of the guide device is processed to determine if the video includes one or more features, e.g. visual features such as edges, surfaces, lines, objects, faces, alphanumeric characters, symbols, or other features, associated with one or more recognized locations along a path of an experience. For example, various features 706, 710, 712 within the video data 702 may be processed by image recognition algorithms. The features may include a sign or placard 710-1, items 706-1, 706-2, 706-3, 706-4, people 712, characters, logos, labels, symbols, or other objects in the foreground, as well as walls, signs 710-2, characters, logos, labels, symbols, or other objects in the background. As discussed herein, processing of the video may be done by the computing component 118 of the guide device, by the augmented reality signal service 100 operating on the remote computing resources 101, by the user device 102, and/or by combinations thereof.

For example, one or more object detection algorithms, edge detection algorithms, etc. may be used to detect features in the video data and those features may be compared with a plurality of stored feature information corresponding to recognized locations along the path of the experience within the destination location. If one or more detected features correspond with a recognized location above a threshold degree of confidence, it may be determined that the guide device is located at the recognized location, and one or more augmented reality signals associated with the recognized location may be selected and used to augment the video data presented by the user device.

For example, as shown in FIG. 7, it may be determined, based on processing of visual features by image recognition algorithms, that the guide device is located at or near location 205-4 along the path 202. Alternatively, a GPS sensor or other location-determining sensors associated with the guide device, as described further herein, may provide additional data to identify a location of the guide device, potentially in combination with the image processing techniques described herein, and the location data from such sensors may be used to trigger the identification, rendering, and/or display of associated augmented reality signals. Moreover, a guide may be able to manually trigger augmented reality signals associated with a location, potentially in combination with location identification via image processing techniques and/or location data from sensors, via interaction with components of the guide device, e.g., a touch interface, a mechanical input, or other input devices. Further, an inset map detail 704 may also be presented with the video data 702, e.g., to help orient and guide the user along the path.

Upon determining that the guide device is located at or near location 205-4, a plurality of selectable augmented reality signals 708-1, 708-2, 708-3, 708-4 may be presented to the user. The signals 708 may be placed adjacent to features recognized using the image processing techniques described herein. For example, edges, surfaces, lines, signs, text, symbols, identifiers, and/or characters related to each of the items may be recognized, and the signals 708 may be placed adjacent or on top of a portion of each of the identified features.

Upon receiving a selection of one of the signals 708, an augmented reality signal 720 associated with the selected signal 708 at the recognized location may be presented with the video data 702. For example, in the example shown in FIG. 7, signal 708-2 has been selected by the user, as indicated by the different visual presentation of signal 708-2, as compared to signals 708-1, 708-3, 708-4, and as a result, the augmented reality signal 720-4B associated with the selected signal 708-2 may be presented to the user. Other methods of indicating a selected signal (or indicating unselected signals) may be used, including highlighting, flashing, changing size, changing color, changing shape, fading, making translucent or transparent, or other visual changes. A user may interact with or select a signal by, for example, selecting the signal with a mouse or other form of input device, touching the presentation of the signal if presented by a touch-based display of the user device, etc.

Further, based on the stored associations between the location 205-4 and the augmented reality signals 220, e.g., augmented reality signals 708-2 and 720-4B, container 302, compartments 304, items 306, covers 308, and/or identifiers 310, the presented augmented reality signal 720-4B may include recommendations to try a physical item provided to the user in the container as part of the experience, e.g., item 306-10 in compartment 304-10 with cover 308-10 having identifier 310-10, i.e., "D2." As shown in this example, physical item samples of a plurality of available products at a recognized location may be provided, and multiple augmented reality signals may be associated with each physical item, e.g., signals 708-2 and 720-4B associated with item 306-10, and presented to the user, with one or more signals being presented upon identifying a recognized location using the image processing techniques described herein, and with one or more additional signals being presented upon receiving a selection among the one or more signals. In addition, the augmented reality signals 708-2 and/or 720-4B may also include one or more selectable links to other websites or external entities and/or purchasing options related to items available from locations.

For any of the example augmented reality signals described herein that may be presented to a user with video data, a user may confirm receipt, viewing, and/or completion of recommended actions within the signals. For example, the signals may include a selectable option or button, e.g., "Done" or "Confirmed," with which a user may interact or select. The signals may also include a selectable option to close, minimize, or otherwise dismiss the signals, e.g., "Close" or "X." In addition, the signals may request input by the user via other input devices, such as a keyboard, mouse, touch screen or others. Moreover, the signals may also include text boxes, input fields, rating stars or indicators, or other options such that the user may provide feedback related to the physical items included as part of the experience. Furthermore, view or click rates and/or histories for specific physical items may also be tracked and provided as feedback.

Any feedback provided by the user may be provided to the guide device and/or the remote computing resources 101. For example, if multiple users are viewing the same experience with a single guide and associated guide device, feedback from each of the multiple users may be provided to the guide device such that the guide may wait for each user to confirm, close, or otherwise dismiss signals associated with physical items before proceeding further in the experience. In addition, feedback provided to the remote computing resources 101 may be used by an entity managing the experiences to change, improve, or discontinue various experiences or portions thereof. Further, feedback regarding specific physical items may also be provided to vendors or providers of such items included as part of the experience.

While the examples discussed herein describe the use of the implementations to explore areas such as Pike Place Market, the implementations discussed herein may likewise be used to explore and/or experience other areas for similar or different purposes. For example, the guide and guide device may be located in a shopping center, a restaurant, a café, a grocery store, a clothing store, a furniture store, a home products store, or any other location for which physical items or samples may be provided to a user as part of an augmented reality experience, in order to provide a more immersive experience that may utilize up to all five senses: sight, hearing, touch, taste, and smell.

In still other examples, the implementations described herein may be utilized to enable persons, e.g., disabled persons, hospitalized persons, etc., to experience other environments and/or perform tasks that they otherwise would not be able to accomplish. For example, a guide may be located in a grocery store and provide video and/or audio data to a user, e.g., a user who is disabled and unable to visit the grocery store themselves, or a user who prefers to shop online or remotely. The augmented reality signals at one or more recognized locations within the grocery store may correspond to items of potential interest to the user (e.g., shopping list items, recommended items, sale items). As the guide moves through the grocery store, image data from the guide device may be processed to detect features within the image data. As features are detected and locations recognized, signals may be generated that, for example, highlight or indicate one or more physical item samples to the user. For example, a container of physical item samples may be provided to a user, e.g., on a weekly or monthly schedule similar to a grocery store circular, pamphlet, or flyer, and the user may be able to sample various physical items while performing other, routine weekly or monthly tasks. The user, upon locating an item of interest, may then instruct the guide to retrieve and purchase the item on the user's behalf.

As will be appreciated, the implementations discussed herein may be used for a wide variety of purposes and the provided examples are for illustration only and should not be considered limiting.

Figure 8:
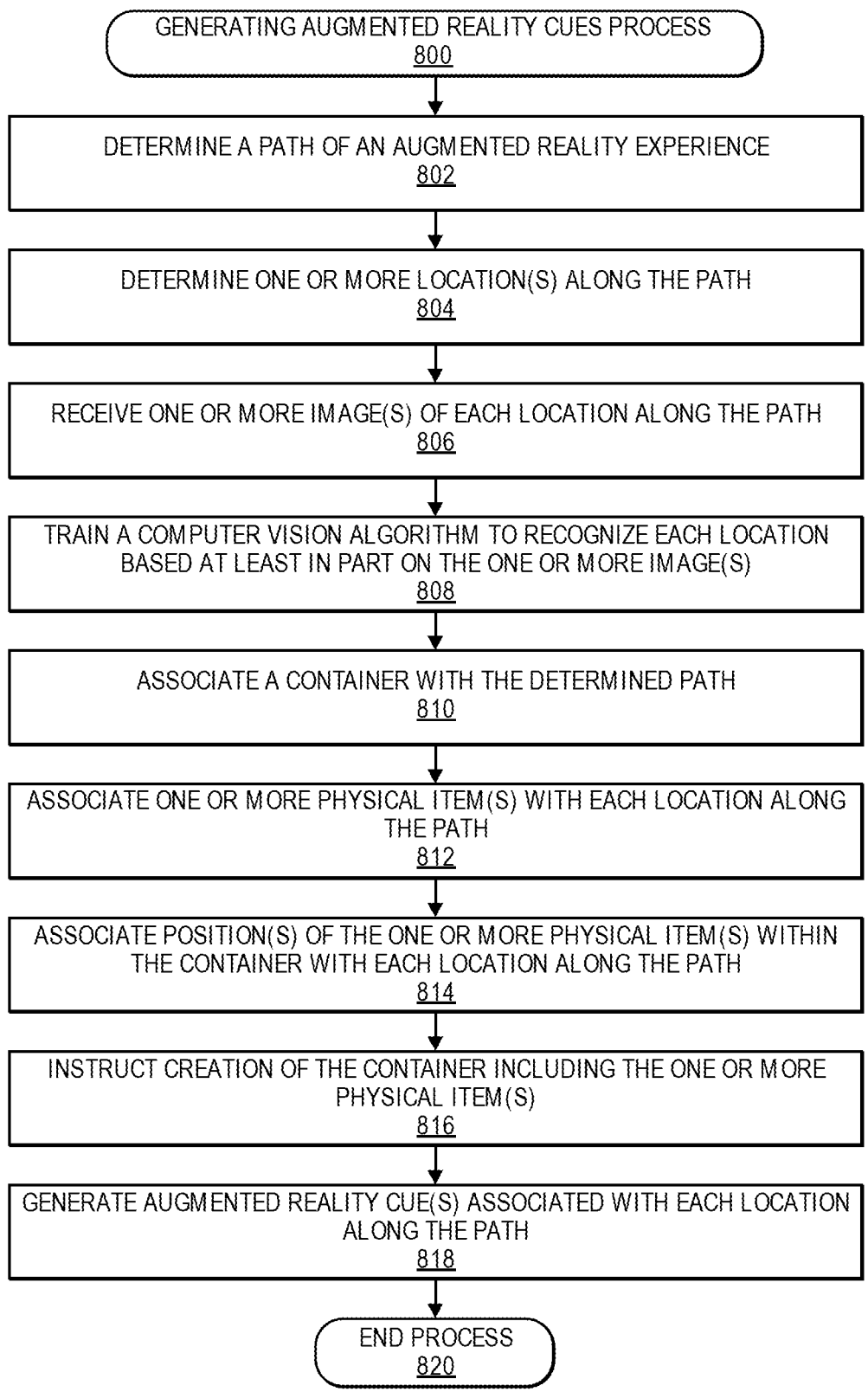
FIG. 8 illustrates an example signal generation process, according to an implementation.

FIG. 8 illustrates an example signal generation process 800, according to an implementation. The process of FIG. 8 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 800 may begin by determining a path for an augmented reality experience, as in 802. For example, the path may represent an intended or expected path of travel at a destination location for a guide and guide device that will provide video data associated with the augmented reality experience. The process 800 may continue by determining one or more locations along the path, as in 804. The locations along the path may be selected in order to highlight various places of interest, stores, vendors, items, regional or local specialties, or any other aspects of the experience. For example, as shown in FIGS. 4-7, the locations may be selected to highlight particular vendors or products available within Pike Place Market. Further, the locations may be selected based on various other factors, including popularity, exclusivity, ratings, business or contractual relationships, sponsorships, or other factors.

The process 800 may proceed by receiving one or more images, e.g., training images, of each determined location along the path, as in 806. The training images may include representations of each location from various angles, at different times, or with other variations. The training images may be used to train one or more computer vision, or image recognition, algorithms, as in 808. For example, the image recognition algorithms may be trained to recognize each of the locations based at least in part on the provided training images. The training of the image recognition algorithms may be continuous, repeated, or updated over time as additional images of the location are identified and provided as inputs to the image recognition algorithms.

The process 800 may then continue by associating a container with the determined path, as in 810. For example, the container may be configured and sized to hold various physical items associated with the experience. Then, one or more physical items may be associated with each determined location along the path, as in 812. For example, the one or more physical items may include samples, or simulated samples, of various products or items available from or related to the determined locations. For example, as shown in FIGS. 4-7, the physical items may include food or product samples that a user may touch, taste, smell, see, and/or hear as part of the experience. Then, the one or more physical items may be associated with respective positions within the container, as in 814. For example, the container may include various compartments having covers and associated unique identifiers, and each of the physical items may be associated with a respective compartment and its associated unique identifier. Then, the process 800 may instruct creation of the container including the one or more physical items, as in 816. For example, each physical item may be placed in its associated compartment, and the compartments of the container may be closed or sealed for subsequent delivery and use by a user.

The process 800 may then generate one or more augmented reality signals or cues associated with each determined location on the path, as in 818. For example, one or more augmented reality signals may be generated and associated with each determined location and each physical item included in the container. The augmented reality signals may be presented to a user when the guide device is at the determined location, and/or some of the augmented reality signals may be presented upon selection or interaction by a user when the guide device is at the determined location. In addition, the signals may also include other selectable options or input fields, e.g., to confirm or dismiss the signals and/or to provide feedback related to the items. The process 800 may then end, as in 820.

Figure 9:
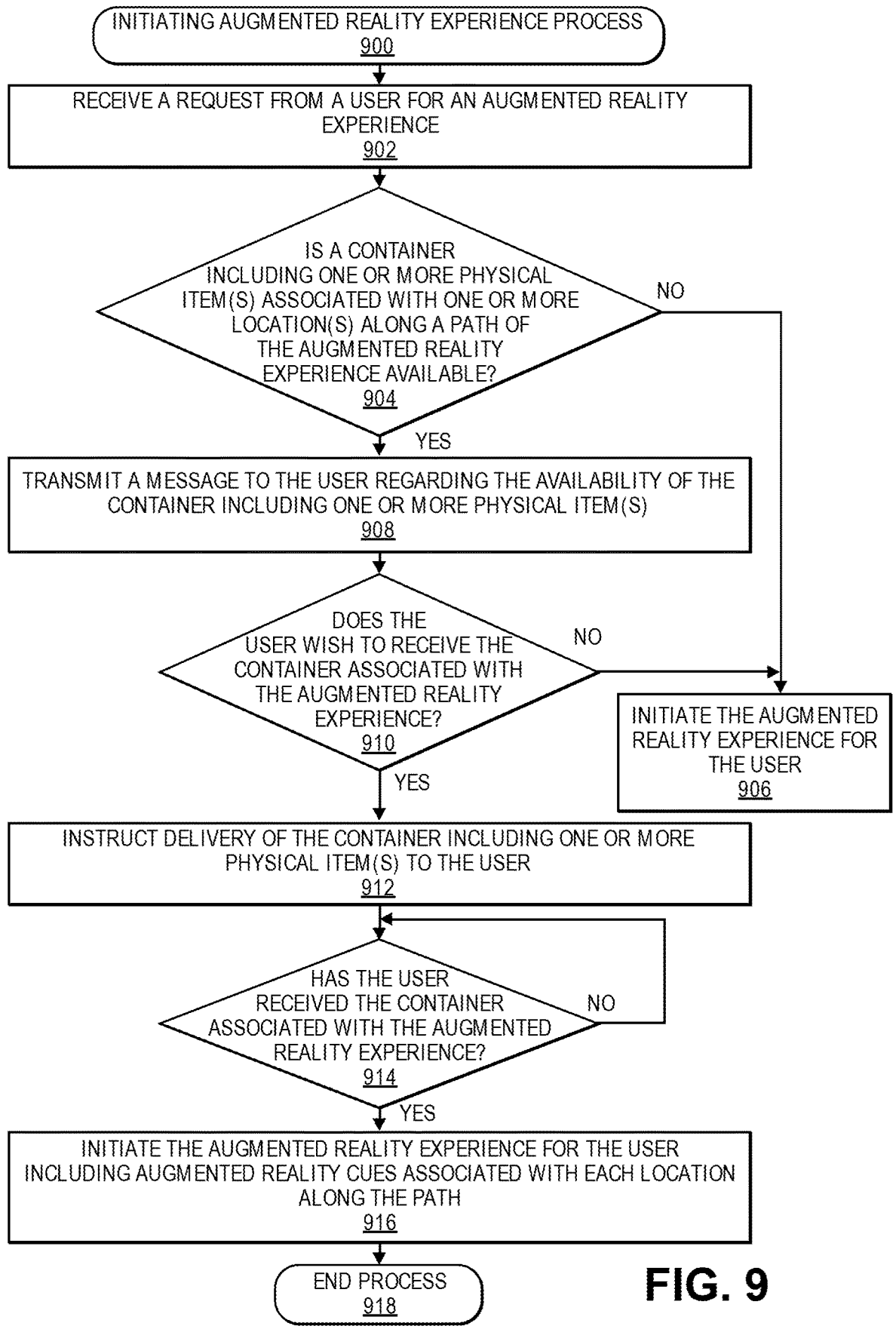
FIG. 9 illustrates an example experience initiation process, according to an implementation.

FIG. 9 illustrates an example experience initiation process 900, according to an implementation.

The process 900 may begin by receiving a request from a user for an augmented reality experience, as in 902. For example, the experience may include a path and associated determined or recognized locations along the path at a destination location. The process 900 may continue by determining whether a container including one or more physical items associated with the experience is available, as in 904. For example, the physical items may be associated with recognized locations along the path of the experience. A plurality of containers associated with various experiences may be manufactured, assembled, and/or stored, e.g., in a warehouse or other facility, and made available to users who request the corresponding experience. If a container associated with the experience is not available, then the process 900 may initiate the augmented reality experience for the user, as in 906, without any augmented reality signals associated with physical items as part of the experience.

If, however, a container associated with the experience is available, then the process 900 may proceed by transmitting a message to the user regarding such availability, as in 908. For example, the message may include an option to purchase or receive the container as part of the experience and may be provided to the user using any type of communication, e.g., via the Internet, the user device, a web browser, email, text message, other applications, or other methods. Then, it may be determined whether the user wishes to receive the container associated with the experience, as in 910. If the user does not wish to receive the container, then the process 900 may initiate the augmented reality experience for the user, as in 906, without any augmented reality signals associated with physical items as part of the experience.

If, however, the user does wish to receive the container associated with the experience, then the process 900 may continue by instructing delivery of the container to the user, as in 912. For example, the user may provide purchase and/or delivery information to the entity managing the containers and/or the experience, and the container may be delivered to the user. Then, the process 900 may determine whether the user has received the container associated with the experience, as in 914. For example, before initiating the experience, the user may be asked whether s/he has received the container. In addition, delivery tracking information or other similar information may be used by the entity managing the experience to determine whether the user has received the container. If it is determined that the user has not yet received the container, the process 900 may continue to wait for confirmation.

If, however, the user has received the container associated with the experience, then the process 900 may initiate the augmented reality experience including augmented reality signals related to one or more physical items included in the container as part of the experience, as in 916. For example, each of the one or more physical items may be associated with one or more signals that are presented to the user at recognized locations along the path of the experience, and the user may try, or have the option to try, the one or more physical items at such recognized locations during the experience. The process 900 may then end, as in 918, and may continue to all or portions of FIG. 10 described herein.

Figure 10:
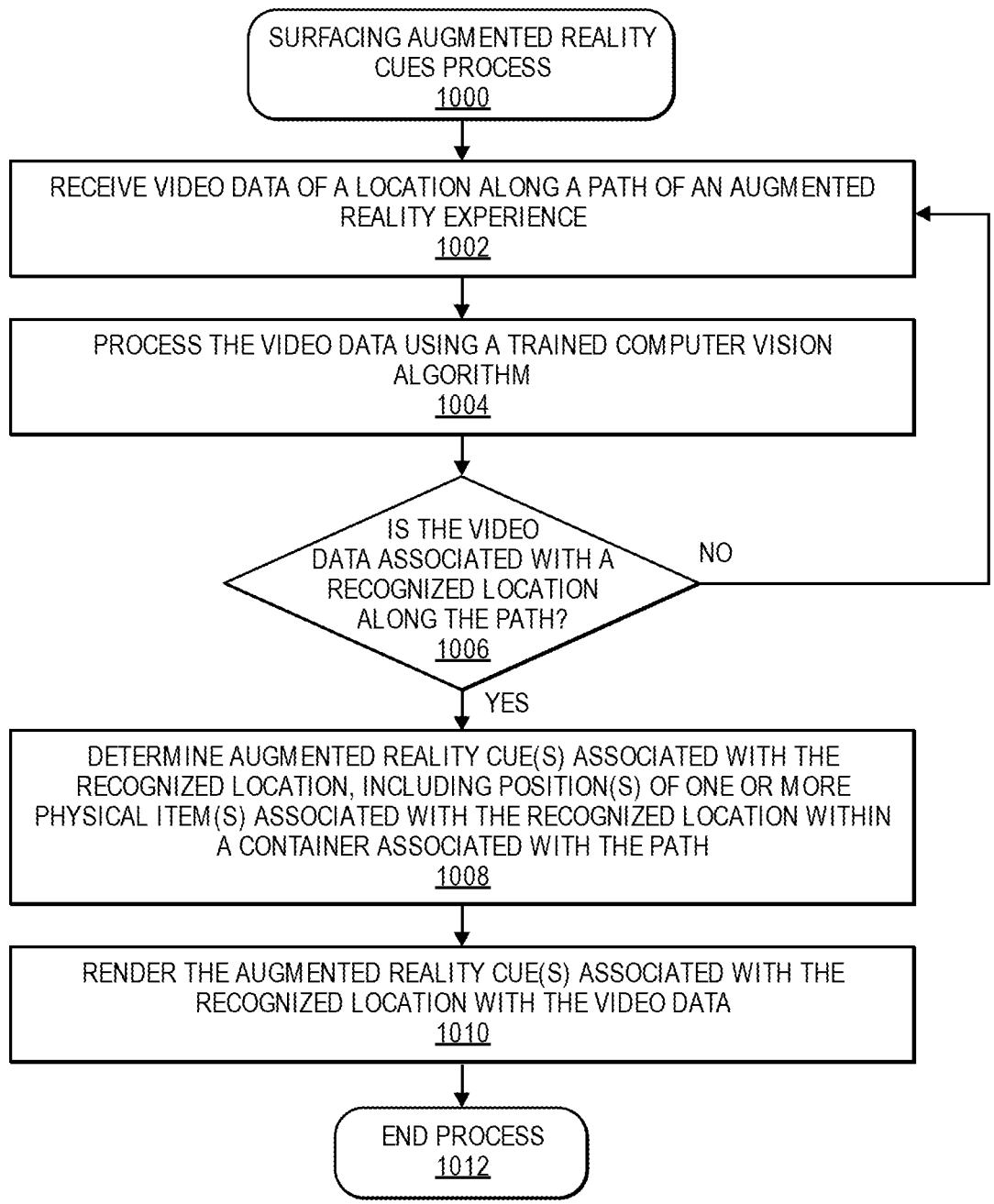
FIG. 10 illustrates an example signal presentation process, according to an implementation.

FIG. 10 illustrates an example signal presentation process 1000, according to an implementation.

The process 1000 may begin by receiving video data from a guide device during an experience presented to a user, as in 1002. For example, the video data received from the guide device may include imaging data associated with a particular location along the path of the experience. The video data may include various items, objects, individuals, faces, structures, signs, or other features at the particular location. The process 1000 may continue by processing the video data using one or more trained image recognition algorithms, as in 1004. For example, the video data may be processed to identify various items, objects, individuals, faces, structures, text, characters, symbols, edges, lines, surfaces, colors, or other features at the particular location.

Then, the process 1000 may determine whether the identified features from the video data correspond to a recognized location along the path of the experience, as in 1006. For example, using the one or more trained image recognition algorithms, the identified features from the video data may be compared to stored feature information of the recognized locations along the path to determine whether the identified features correlate with one of the recognized locations with a threshold level of confidence. Alternatively, a GPS sensor or other location-determining sensors associated with the guide device, as described further herein, may provide additional data to identify a location of the guide device, potentially in combination with the image processing techniques described herein, and the location data from such sensors may be used to trigger the identification, rendering, and/or display of associated augmented reality signals. Moreover, a guide may be able to manually trigger augmented reality signals associated with a location, potentially in combination with location identification via image processing techniques and/or location data from sensors, via interaction with components of the guide device, e.g., a touch interface, a mechanical input, or other input devices. If the identified features do not correlate with any of the recognized locations along the path, the process 1000 may return to 1002 to receive additional video data of additional locations for processing.

If, however, the identified features do correlate with a recognized location along the path, the process 1000 may identify one or more augmented reality signals that are associated with the recognized location, as in 1008. For example, the associations between augmented reality signals and recognized locations may be stored in memory of one or more computing devices and resources, as described herein. In addition, associations between the augmented reality signals and recognized locations, and containers, compartments, physical items, covers, and/or identifiers provided on such covers may also be stored in memory of one or more computing devices and resources. Based at least in part on the stored associations, one or more augmented reality signals may be identified for presentation to the user at the recognized location. For example, the one or more augmented reality signals may provide additional details or information related to the recognized location and one or more physical items, compartments, covers, and/or identifiers of the container, such that the user may be prompted to try the one or more physical items that are available from or related to the recognized location.

The process 1000 may continue by rendering one or more of the augmented reality signals associated with the recognized location for presentation to the user with the video data, as in 1010. In some embodiments, one or more signals may be rendered and presented to the user upon identifying that the guide device is at a recognized location, without input or selection by a user. In other embodiments, one or more additional signals may be rendered and presented to the user upon receiving input or selection of the one or more signals from a user. For example, a selectable augmented reality signal, e.g., a symbol or indicator, may be presented adjacent to an object or item of interest at the recognized location, and upon selection or interaction by the user, an additional augmented reality signal, e.g., a recommendation to try a physical item sample available from or related to the recognized location, may be presented to the user. In addition, the rendered signals may include further options to select or interact with the signals, e.g., to confirm or dismiss signals, and/or to provide feedback related to the physical items.

Alternatively or in addition to rendering one or more augmented reality signals associated with the recognized location for presentation to the user, the one or more augmented reality signals or information associated therewith may also be identified or indicated to the guide via the guide device, and/or the one or more augmented reality signals or information associated therewith may also be rendered for presentation to the guide via the guide device. For example, the guide may receive an indication that an augmented reality signal related to a current location is available, and the guide may then be able to manually trigger the rendering of the augmented reality signal for presentation to the user. In this manner, the guide may be able to provide a more cohesive, guided experience by communicating with the user prior to or concurrently with manually triggering one or more augmented reality signals, in order to avoid interrupting or distracting a user with augmented reality signals that are rendered without context or introduction provided by a guide upon notification of the availability of such signals.

The process 1000 may repeat as long as additional video data is received from the guide device, and/or as long as additional signals related to physical items remain to be potentially presented to the user as part of the experience. After completion of the experience, the process 1000 may then end, as in 1012.

Figure 11:
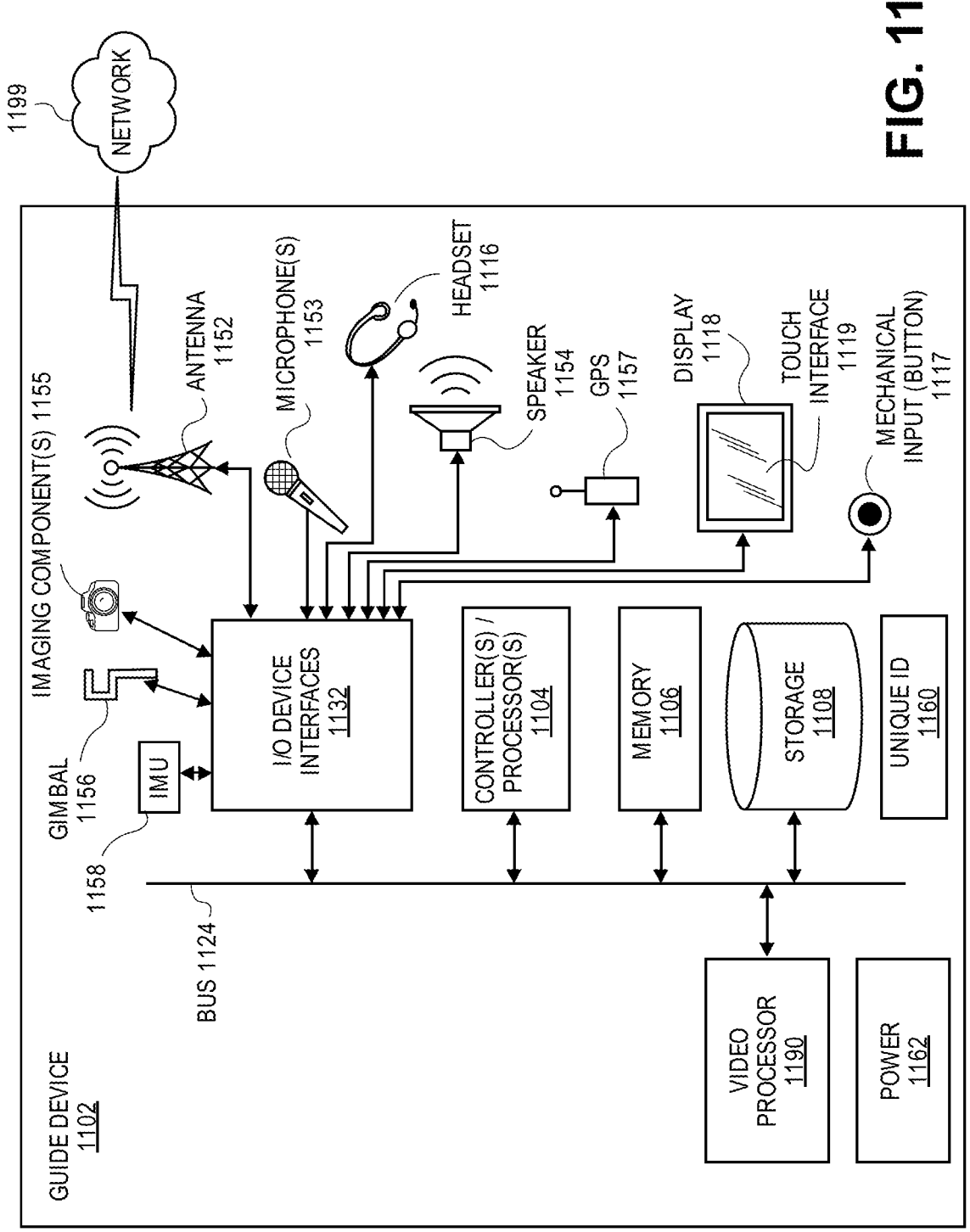
FIG. 11 illustrates an example guide device, according to an implementation.
Figure 12:
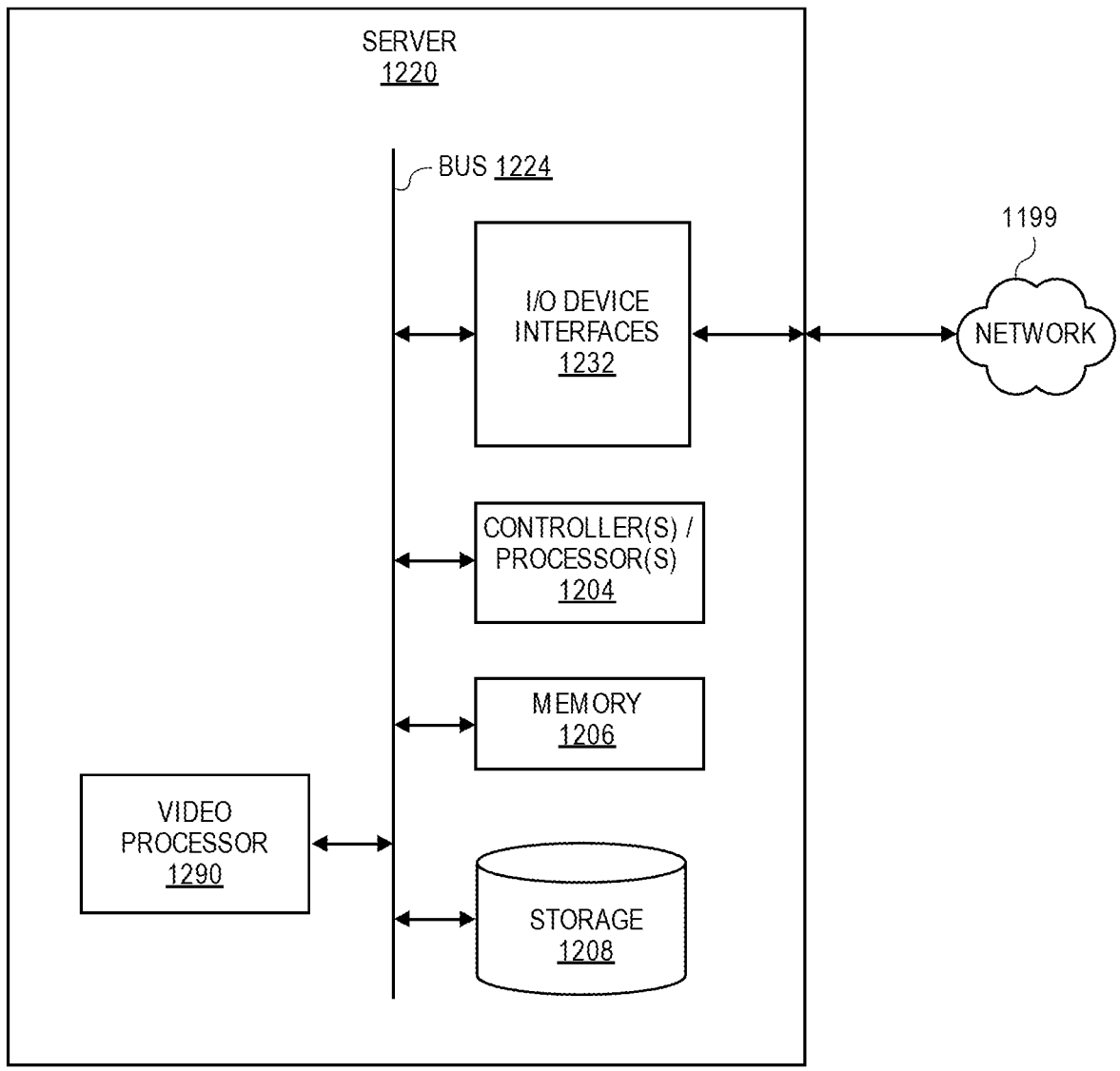
FIG. 12 illustrates example components of a server, according to an implementation.

FIG. 11 is a block diagram conceptually illustrating a guide device 1102 that may be used with the described system. FIG. 12 is a block diagram conceptually illustrating example components of a remote device, such as a remote server 1220 that may assist with processing, detecting features in video data, image processing and recognition, rendering augmented reality signals, generating augmented video data, and the like. Multiple such servers 1220 may be included in the system, such as one server(s) 1220 for feature detection in video data and other image processing and recognition, one server(s) 1220 for rendering the signals and generating augmented video data, etc. In operation, each of these devices (or groups of devices) may include computer-readable and computer-executable instructions that reside on the respective device (1102/1220), as will be discussed further below.

Each of these devices (1102/1220) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1132/1232).

Computer instructions for operating each device (1102/1220) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (1102/1220) includes input/output device interfaces (1132/1232). A variety of components may be connected through the input/output device interfaces, as will be discussed further below. Additionally, each device (1102/1220) may include an address/data bus (1124/1224) for conveying data among components of the respective device. Each component within a device (1102/1220) may also be directly connected to other components in addition to (or instead of) being connected to other components across the bus (1124/1224).

Referring to the guide device 1102 of FIG. 11, the device 1102 may include a display 1118, which may comprise a touch interface 1119. Alternatively, the device 1102 may be "headless" and may primarily rely on spoken commands and/or mechanical inputs (e.g. buttons) for input. For example, as a way of manually triggering one or more augmented reality signals for presentation to a user at particular locations, the guide may provide an indication through a mechanical input 1117, such as a mechanical button, or via a selectable option displayed on the touch interface 1119. As another example, to provide feedback to the guide that a user has interacted with, confirmed, or dismissed a signal and/or that a signal is being presented to the user, audible feedback may be output through a speaker 1154 and/or through the headset 1116 that may be worn by the guide and include a speaker and microphone, and/or visual feedback may be output via the display 1118.

The device 1102 also includes an imaging component 1155, such as a digital video camera, which may be mounted to the guide, mounted on a gimbal 1156 that is held by the guide, etc. The gimbal 1156 may be coupled to the input/output device interface 1132 and be configured to receive commands from a user that cause the gimbal to rotate or otherwise change the orientation of the field of view of the imaging component 1155. Likewise, the imaging component 1155 may receive through the input/output interface 1132 commands to generate digital images, alter the zoom of the imaging component 1155, etc. Likewise, the imaging component 1155 provides video data and/or generated digital images through the input/output interface 1132 for transmission to the user device and/or the augmented reality signal service, as discussed above. In general, the input/output interfaces 1132 between the gimbal 1156 and the imaging component 1155 provide a user at any location that is communicating with the guide and the guide device 1102 the ability to control the field of view of the imaging component 1155 and selectively determine the content of the destination location presented to the user.

The guide device 1102 may also include input/output device interfaces 1132 that connect to a variety of other components such as an audio output component, such as a speaker 1154, a wired headset or a wireless headset 1116, and/or other components capable of outputting audio. The audio capture component may be, for example, a microphone 1153 or array of microphones, a wired headset or a wireless headset, etc. The microphone 1153 may be configured to capture audio, such as sounds within the destination location and/or sounds received from other people or objects within the destination location. If an array of microphones is included, approximate distance and direction to a sound's point of origin may be determined using, for example, acoustic localization based on time and amplitude differences between sounds captured by different microphones of the array. Such direction and distance information may be used to determine whether received sounds are associated with a person or object within a field of view of the imaging component in order to determine whether presented audio data and video data at the user device needs to be synchronized.

The guide device also includes one or more antennas 1152 that connect to one or more networks 1199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. Through the network(s) 1199, audio data, video data, signal information, etc. may be transmitted to the augmented reality signal service and/or to the user device for presentation by the user device to a user that is communicating with the guide and controlling components of the guide device 1102.

The guide device 1102 may also include a location component, such as a GPS 1157, an indoor positioning system, or other location-based or location-determining component. Likewise, in some implementations, the guide device 1102 and/or the server 1220 may include one or more video processors 1190/1290 that are configured to process video data generated by the imaging component 1155 of the guide device 1102. As discussed above, the video processors 1190/1290 may process the video data to determine if one or more features are present in the video data, to determine position information for signals to present with the video data to produce augmented video data, to render augmented reality signals, and/or to generate augmented video data that includes the video data and the augmented reality signals.

The guide device may also include one or more inertial measurement units (IMU) 1158. As is known in the art, an IMU may include an accelerometer, a gyroscope, and/or a compass and provide position information based on the accelerometer, gyroscope and/or compass. In some implementations, an IMU 1158 may be included in the gimbal 1156 and provide position information indicating an orientation of the imaging component 1155 mounted to the gimbal. As another example, an IMU 1158 may be included on the imaging component 1155 and position information may be provided to indicate a position or orientation of the imaging component 1155. In still another example, an IMU 1158 may be included on the guide themselves and position information may be provided to indicate a position or orientation of the guide. Further, the guide device may also include a power supply 1162 that is operatively connected to any or all of the various components of the guide device to provide power to such components.

Multiple guide devices may be employed in a single system and different users may connect with, communicate with, and control different guide devices. As such, each guide device may also include a unique identifier 1160. The unique identifier may be any form of unique identification and may be included in video data and/or audio data that is transmitted from the guide device. Likewise, a user device and/or the augmented reality signal service may utilize the unique identifier to enable communication and/or control with the guide device. In such a multi-device system, each of the guide devices may include the same or different components. The components of the guide device 1102 and the server 1220, as illustrated in FIGS. 11 and 12, are exemplary, and should not be considered limiting to the implementations discussed herein.

The concepts disclosed herein may be applied within a number of different devices and computer systems, including, for example, general-purpose computing systems, video processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, video processing, and augmented reality should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "near," "nearly" or "substantially" as used herein, represent a value, amount, or characteristic close to the stated value, amount, or characteristic that still performs a desired function or achieves a desired result. For example, the terms "about," "approximately," "generally," "near," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method for displaying augmented reality cues, comprising:
   receiving, from an imaging device associated with a guide device, video data along a path of an augmented reality experience, the augmented reality experience being presented to a user via a user device;
   analyzing the video data to determine visual features associated with the video data;
   determining, using a trained computer vision algorithm, that the visual features associated with the video data are consistent with a recognized location along the path of the augmented reality experience;
   identifying an augmented reality cue associated with the recognized location, the augmented reality cue further associated with at least one physical item sample provided to the user of the user device prior to initiation of the augmented reality experience, and the at least one physical item sample corresponding to an item available from the recognized location during the augmented reality experience; and
   rendering the augmented reality cue for presentation to the user via the user device as part of the augmented reality experience.

2. The computer-implemented method of claim 1, further comprising:
   receiving, via the user device, a request for the augmented reality experience;
   determining that a container including the at least one physical item sample is associated with the augmented reality experience; and
   causing delivery of the container including the at least one physical item sample to the user of the user device.

3. The computer-implemented method of claim 2, further comprising:
   transmitting, to the user device, a message indicating availability of the container including the at least one physical item sample associated with the augmented reality experience; and
   receiving, via the user device, a confirmation that the user wishes to receive delivery of the container including the at least one physical item sample associated with the augmented reality experience.

4. The computer-implemented method of claim 2, further comprising:
   receiving, via the user device, a confirmation that the user has received delivery of the container including the at least one physical item sample associated with the augmented reality experience.

5. A computer-implemented method, comprising:
   receiving, from an imaging device associated with a guide device, at least one image from an augmented reality experience, the augmented reality experience being presented to a user via a user device;
   processing the at least one image to determine at least one feature associated with the at least one image;
   determining, using a trained image recognition algorithm, that the at least one feature associated with the at least one image is consistent with a recognized location of the augmented reality experience;
   identifying an augmented reality signal associated with the recognized location, the augmented reality signal further associated with at least one item provided to the user of the user device prior to initiation of the augmented reality experience, and the at least one item corresponding to an item associated with the recognized location; and
   at least one of: providing information associated with the augmented reality signal via the guide device, or rendering the augmented reality signal for presentation to the user via the user device as part of the augmented reality experience.

6. The computer-implemented method of claim 5, wherein the at least one image comprises a portion of video data received from the augmented reality experience.

7. The computer-implemented method of claim 5, wherein the at least one feature comprises at least one of an edge, a surface, a line, an object, a face, an alphanumeric character, or a symbol identified in the at least one image.

8. The computer-implemented method of claim 5, wherein the at least one item comprises a physical sample of one or more items available from or related to the recognized location.

9. The computer-implemented method of claim 5, wherein the recognized location comprises one of a plurality of recognized locations along a path of the augmented reality experience; and further comprising:
   rendering an indication of at least the recognized location along at least a portion of the path for presentation to the user via the user device as part of the augmented reality experience.

10. The computer-implemented method of claim 9, wherein the augmented reality signal associated with the recognized location comprises one of a plurality of augmented reality signals associated with the augmented reality experience, each of the plurality of augmented reality signals being associated with a respective recognized location of the plurality of recognized locations along the path of the augmented reality experience.

11. The computer-implemented method of claim 5, further comprising:
- receiving, via the user device, a request for the augmented reality experience;
- determining that a container including the at least one item is associated with the augmented reality experience; and
- causing delivery of the container including the at least one item to the user of the user device.

12. The computer-implemented method of claim 11, wherein the container includes a plurality of items associated with the augmented reality experience, each of the plurality of items being associated with a respective recognized location of a plurality of recognized locations along a path of the augmented reality experience.

13. The computer-implemented method of claim 12, wherein each of the plurality of items is contained within a respective compartment of a plurality of compartments of the container, each of the plurality of compartments including a respective unique identifier on a cover, seal, or flap of the compartment.

14. The computer-implemented method of claim 13, wherein the augmented reality signal includes an indication of a respective unique identifier of a respective compartment in which the at least one item is contained.

15. The computer-implemented method of claim 13, wherein the augmented reality signal comprises one of a plurality of augmented reality signals associated with the recognized location, each of the plurality of augmented reality signals associated with a different respective portion of the recognized location; and
- receiving, via the user device, a selection of one of the plurality of augmented reality signals;
- responsive to the selection, rendering a second augmented reality signal for presentation to the user via the user device as part of the augmented reality experience, the second augmented reality signal including an indication of a respective unique identifier of a respective compartment in which an item associated with the selected augmented reality signal is contained.

16. A computer-implemented method, comprising:
- determining a path of an augmented reality experience;
- determining at least one recognized location along the path;
- receiving at least one training image associated with the at least one recognized location;
- training an image recognition algorithm to identify the at least one recognized location based at least in part on the at least one training image;
- associating at least one physical item with the at least one recognized location;
- generating an augmented reality signal associated with the at least one recognized location and the at least one physical item; and
- responsive to receiving, via a user device, a request for the augmented reality experience, causing delivery of the at least one physical item to a user of the user device prior to initiation of the augmented reality experience, the at least one physical item corresponding to an item available from the at least one recognized location during the augmented reality experience.

17. The computer-implemented method of claim 16, wherein a plurality of recognized locations are determined along the path, and wherein a plurality of physical items are each associated with a respective recognized location of the plurality of recognized locations.

18. The computer-implemented method of claim 17, further comprising:
- instructing creation of a container including a plurality of compartments, each of the plurality of compartments containing a respective one of the plurality of physical items and including a respective unique identifier on a cover, seal, or flap of the compartment.

19. The computer-implemented method of claim 18, wherein a plurality of augmented reality signals are generated, each of the plurality of augmented reality signals associated with a respective recognized location and a respective one of the plurality of physical items; and
- wherein each of the plurality of augmented reality signals includes an indication of a respective unique identifier of a respective compartment in which a respective item is contained.

20. The computer-implemented method of claim 16, further comprising:
- receiving, via the user device, the request for the augmented reality experience;
- causing delivery of a container including at least one compartment containing the at least one physical item to the user of the user device;
- receiving, from an imaging device associated with a guide device, at least one image associated with the augmented reality experience being presented to the user via the user device; and
- responsive to identifying the at least one recognized location within the at least one image associated with the augmented reality experience, rendering the augmented reality signal associated with the at least one recognized location and the at least one physical item for presentation to the user via the user device.

* * * * *